US011004291B2

(12) United States Patent
O'Neill et al.

(10) Patent No.: US 11,004,291 B2
(45) Date of Patent: May 11, 2021

(54) COMPUTER-IMPLEMENTED SYSTEM FOR IMAGE PROCESSING OF DOCUMENTS ASSOCIATED WITH ELECTIONS AND METHODS THEREOF

(71) Applicant: Runbeck Election Services Inc., Tempe, AZ (US)

(72) Inventors: William O'Neill, Tempe, AZ (US); Wei He, Tempe, AZ (US); Chris Schiffhauer, Tempe, AZ (US); Don Ingels, Tempe, AZ (US); John Elder, Tempe, AZ (US); Steve Prussing, Tempe, AZ (US); David Siegel, Tempe, AZ (US); Jon Miller, Tempe, AZ (US); Joshua Bonebrake, Tempe, AZ (US)

(73) Assignee: Runbeck Election Services Inc., Tempe, AZ (US)

( * ) Notice: Subject to any disclaimer, the term of this patent is extended or adjusted under 35 U.S.C. 154(b) by 0 days.

(21) Appl. No.: 16/376,996

(22) Filed: Apr. 5, 2019

(65) Prior Publication Data
US 2019/0311563 A1 Oct. 10, 2019

Related U.S. Application Data

(60) Provisional application No. 62/653,017, filed on Apr. 5, 2018, provisional application No. 62/697,884, filed on Jul. 13, 2018.

(51) Int. Cl.
*G07C 13/00* (2006.01)
*G06K 9/00* (2006.01)
(Continued)

(52) U.S. Cl.
CPC ......... *G07C 13/00* (2013.01); *G06K 9/00161* (2013.01); *G06K 9/00449* (2013.01);
(Continued)

(58) Field of Classification Search
CPC .... G07C 13/00; G06K 9/2054; G06K 9/6253; G06K 9/00483; G06K 9/00449;
(Continued)

(56) References Cited

U.S. PATENT DOCUMENTS 7,890,364 B2 2/2011 Piccionelli
2001/0037234 A1 11/2001 Parmasad et al.
(Continued)

FOREIGN PATENT DOCUMENTS

WO WO-0021041 A1 * 4/2000 ............. G07C 13/00

OTHER PUBLICATIONS

International Search Report and Written Opinion in corresponding Application No. PCT/US2019/026125, dated Jun. 20, 2019, 8 pages.

*Primary Examiner* — Brenda C Bernardi
(74) *Attorney, Agent, or Firm* — Polsinelli PC

(57) ABSTRACT

A system for election document processing is disclosed. Image data representative of a scanned election document is matched with a template for processing and consideration of a new elections record. The template defines areas of interest and rules for processing the image data. Data associated with picture elements defining the areas of interest is applied to predetermined validation functions to validate whether the image data includes sufficient information for populating predefined fields and accepting the scanned election document. Additional functions are applied to the image data to compare the image data with information of a voter registration database in order to verify a voter associated with the election document. The scanned election document is further processed for validation sampling.

18 Claims, 35 Drawing Sheets
(26 of 35 Drawing Sheet(s) Filed in Color)

(51) Int. Cl.
*G06T 7/00* (2017.01)
*G06K 9/62* (2006.01)
*G06K 9/20* (2006.01)

(52) U.S. Cl.
CPC ....... *G06K 9/00483* (2013.01); *G06K 9/2054* (2013.01); *G06K 9/6202* (2013.01); *G06K 9/6253* (2013.01); *G06T 7/0002* (2013.01); *G06K 2209/01* (2013.01); *G06T 2207/10008* (2013.01); *G06T 2207/30176* (2013.01)

(58) Field of Classification Search
CPC ............. G06K 9/6202; G06K 9/00161; G06K 2209/01; G06T 7/0002; G06T 2207/30176; G06T 2207/10008; G06F 16/93
See application file for complete search history.

(56) References Cited

U.S. PATENT DOCUMENTS

| | | | |
|---|---|---|---|
| 2002/0169756 A1 | 11/2002 | Biddulph | |
| 2003/0023478 A1* | 1/2003 | Piccionelli | G07C 13/00 705/12 |
| 2008/0112615 A1 | 5/2008 | Obrea | |
| 2011/0125557 A1 | 5/2011 | Runbeck | |
| 2012/0035988 A1 | 2/2012 | Kincaid | |
| 2012/0066032 A1 | 3/2012 | Snider | |
| 2013/0085815 A1* | 4/2013 | Onischuk | G07C 13/00 705/12 |
| 2016/0358191 A1 | 12/2016 | Grossman | |

* cited by examiner

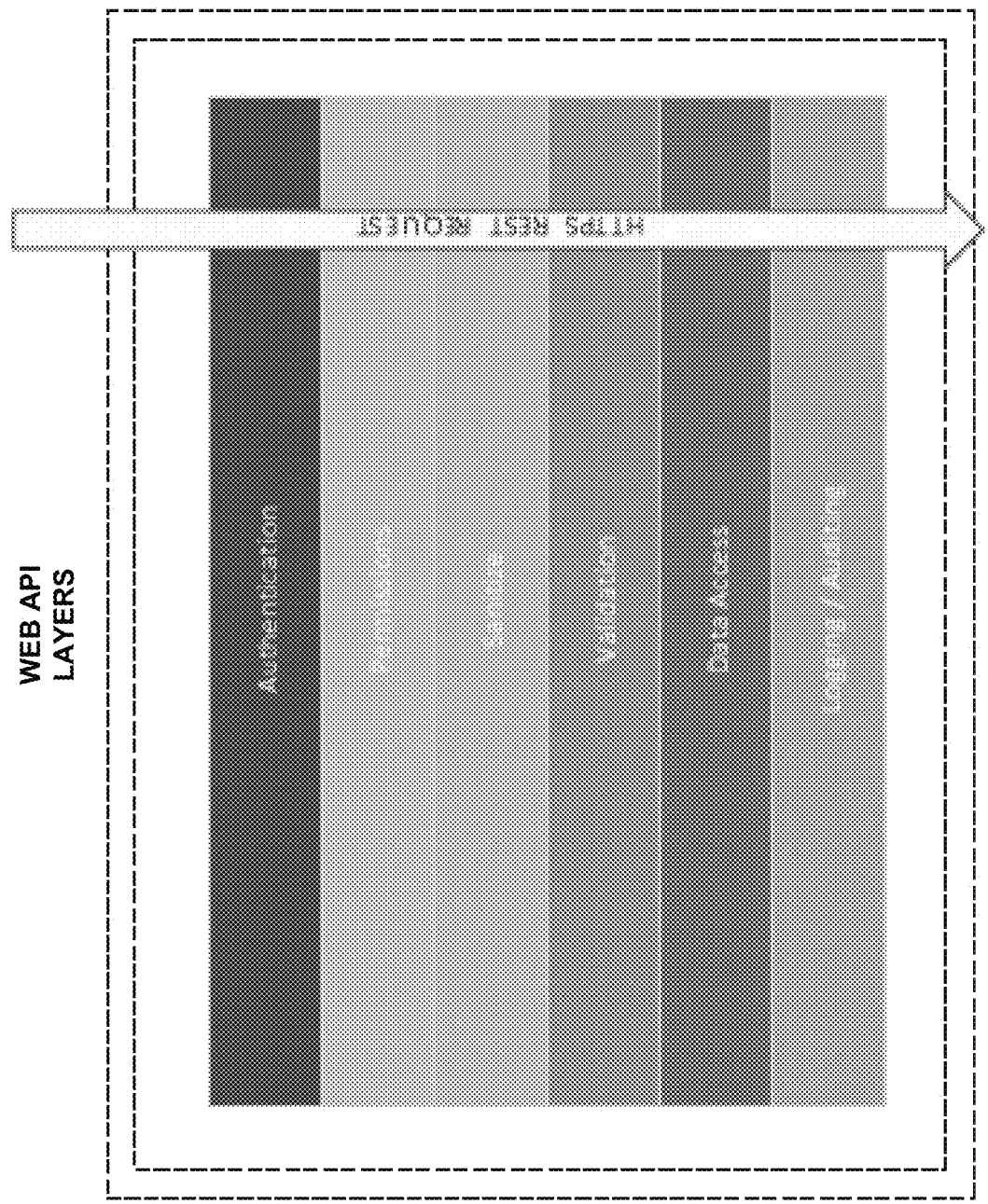

FIG. 2C (Page review)

(Page review with Overlays)

(Signature Review)

COMPUTER-IMPLEMENTED SYSTEM FOR IMAGE PROCESSING OF DOCUMENTS ASSOCIATED WITH ELECTIONS AND METHODS THEREOF

CROSS REFERENCE TO RELATED APPLICATIONS

This is a U.S. non-provisional patent application that: claims benefit to U.S. provisional patent application Ser. No. 62/653,017 filed on Apr. 5, 2018, which is incorporated by reference in its entirety; and further claims benefit to U.S. provisional patent application Ser. No. 62/697,884 filed on Jul. 13, 2018, which are both incorporated by reference in their entirety.

FIELD

The present disclosure generally relates to a computer-implemented system for elections services; and in particular, to a computer-implemented system including one or more scanning, computing, and display devices configured for validation, verification, processing, and display of scanned election documents.

BACKGROUND

Processing of documents during elections is paramount to reducing errors and maintaining efficiency. For example, during elections, candidates for office may qualify for a ballot in generally one of two ways: by collecting voter signatures on a petition, or winning support through a party caucus. In recent years, the number of candidates seeking qualification for elections via petition has increased due to a corresponding increase in available political seats and unpredictability of qualifying for elections by support of a party caucus. Yet, forged signatures on petitions has plagued elections and reduced confidence in elections systems and petitions procedures. Ballot validation and ballot initiatives are plagued by similar issues.

Accordingly, systems capable of processing elections-related documents, such as ballots or petitions, are of increasing demand across the United States and other parts of the world. However, current systems are generally limited to ballot production, lack sufficient validation functions, and are generally inadequate with respect to automation, flexibility, and coverage of the overall voting and petition process.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIG. 1D is a simplified block diagram illustrating exemplary layers of the web API of FIG. 1C.

FIG. 2C is an application screenshot illustrating functionality for editing parameters associated with the petition template as described herein and referenced by FIG. 2A.

Corresponding reference characters indicate corresponding elements among the view of the drawings. The headings used in the figures do not limit the scope of the claims.

DETAILED DESCRIPTION

Figure 1A:
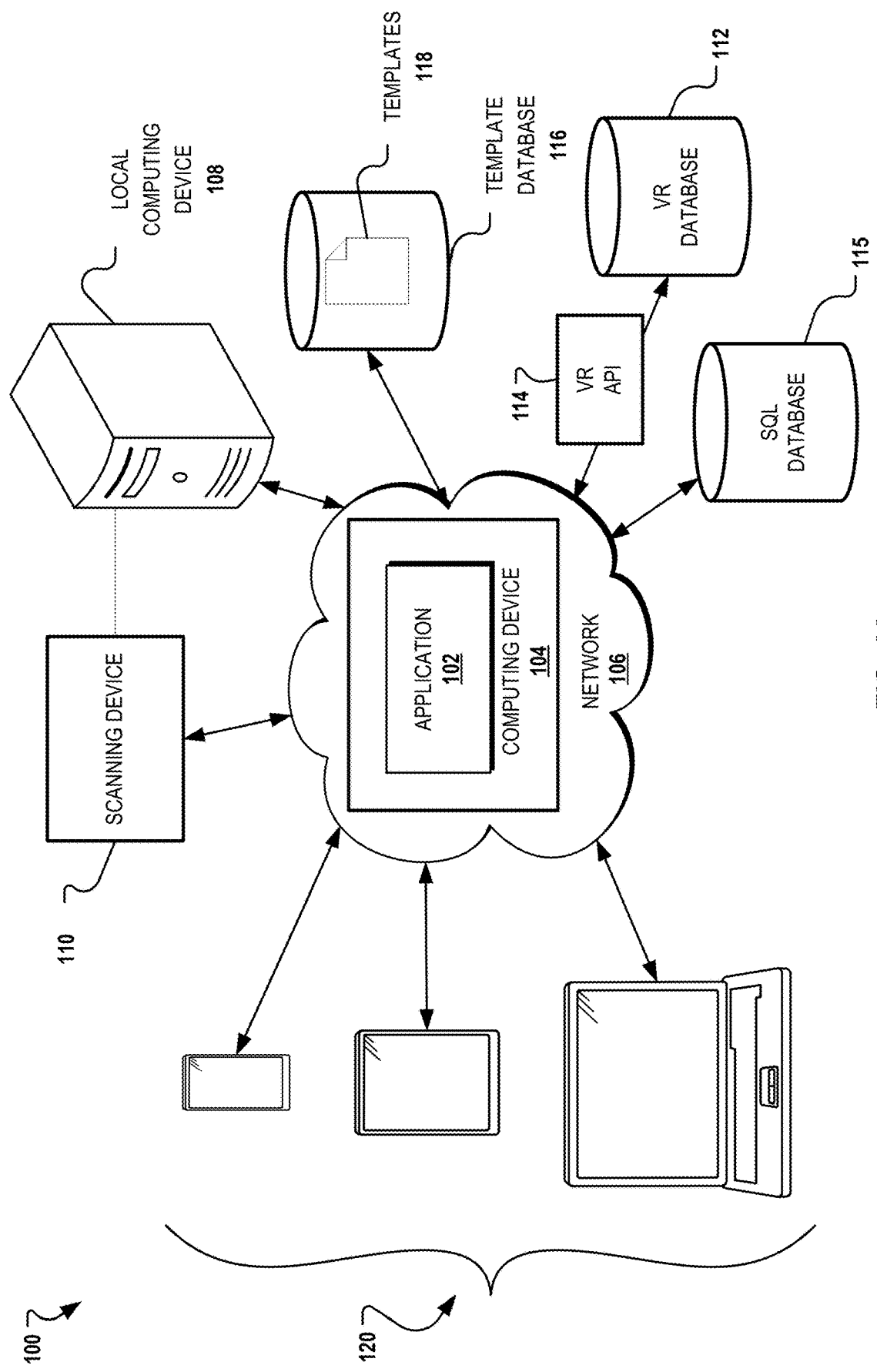
FIG. 1A is a network diagram illustrating an exemplary computer-implemented system for election document validation, verification, and management.

The present disclosure relates to a computing system configured for managing aspects of election services; and more particularly, to a computer-implemented system for managing the scanning and image processing of an election document, such as a petition, in order to validate the document and verify content thereof, according to predetermined base rules and settings specific to certain jurisdictions. More particularly, in some embodiments, the disclosed computer-implemented system may include one or more scanners or scanning devices, computing devices, at least one display, and a voter registration database (VR) collectively configured to process documents efficiently and accurately as described herein. In some embodiments, the computer-implemented system includes an application, aspects of which may be implemented by the scanning and computing devices, that configures one or more computing devices to monitor, track, validate, and verify election documents by leveraging data accessed from the VR database and by leveraging digital templates defining rules and functions for processing certain election documents. The VR database may be uploaded for access by the application or the application may access the VR database in real time. The application may further be integrated with or in communication with a user interface (UI), and at least one application programming interface (API), such as a web API for accommodating access to functionality described herein.

In some embodiments, for example, the application is operable to verify petitions, which may include accessing data associated with the VR database. A petition may be scanned and identified using one or more of the scanning devices. Once a petition is scanned, the petition type of the petition may be identified from the scanned petition image, and validation and verification of voters and other information of the scanned petition image may be initiated according to predetermined rules and fields. For example, the application accommodates the identification and analysis of petition fields, signatures, or any other information in question of the scanned petition image, so that these fields may be verified and accepted or rejected, and petition work can be a tracked during or after processing, through a display dashboard. This conveniently provides end-users or administrators with statistics and/or reports of a petition or multiple petitions being analyzed by the application. In addition to current petitions, statistics of past petitions may also available and managed using the application and one or more computing devices. Further, the application may be configured to perform sampling and voter adjudication for jurisdictions that require sampling of the petition verification and ratification process. Referring to the drawings, one embodiment of a computer-implemented system is illustrated and generally indicated as 100 in FIGS. 1-7.

Referring to FIG. 1A, an exemplary computer-implemented system (hereinafter "system") 100 for implementing functionality associated with petition management is shown. The system 100 may include and/or generally support functionality defined by an application 102 that configures one or more processors or computing devices to provide functionality associated with management of documents associated with elections, among other features as described herein. The application 102 may be hosted on one or more of a computing device 104, which may include a server, controller, a personal computer, a terminal, a workstation, a portable computer, a mobile device, a tablet, a mainframe, or other such computing device. Further, aspects of the application 102 associated with image processing of election documents may be outputted to a display device 105 as described herein.

The computing device 104 is configured for administering and providing functionality of the application 102 via a network 106, which may include the Internet, an intranet, a virtual private network (VPN), and the like. In some embodiments, a cloud (not shown) may be implemented to execute one or more components of the system 100. In addition, aspects of the system 100 and/or the application 102 may be implemented using platform as a service (PaaS), and/or software as a service (SaaS) using e.g., Amazon Web Services, or other distributed systems.

As further shown, aspects of the application 102 may be accessible to or otherwise implemented by a local computing device 108. The local computing device 108 may include a server workstation with at least one server, a controller, a personal computer, a terminal, a workstation, a portable computer, a mobile device, a tablet, a mainframe, or other such computing device. In some embodiments, the local computing device 108 may be associated with and may be generally located at a specific jurisdiction or elections center, such as a particular voting precinct that is responsible for e.g., gathering and processing petitions, and generating and transferring data about the petitions. In some embodiments, the local computing device 108 may form part of the overall system 100 as shown (e.g., where the local computing device 108 is deployed to the particular voting precinct). In other embodiments, the local computing device 108 may simply be any device executed by an end-user for accessing and utilizing aspects of the application 102.

In some embodiments, the local computing device 108 may be in operable communication (by wired connection or wirelessly connected) with at least one of a scanning device 110. The scanning device 110 may be a high-speed scanner, configured to process petitions efficiently in cooperation with the local computing device 108 and the computing device 104 as described herein. In one embodiment, the scanning device 110 may include, e.g., an ImageTrac Intelligent Production Scanner by IBML or other similar device. The IBML scanner may retrieve scanner information from an ODBC database table. It is undesirable to have all IBML scanners having direct access to the database. Therefore, a local table may be created and kept up to date by a service which can intermittently check the system for new petitions. The IBML scanner can have two jobs created. In the first job, "Select Petition" will allow a user to select an active petition. An auto-generated bates number will be used to spray the page. In the second job, "Rescan" will allow a user to select an active petition and enter a bates number. This bates number will be used to spray the page. Further, IBML scanner numbering will be handled locally with a table that keeps track of current bates numbers for all petitions active on the scanner. A standard XML format may be used for outputting scan data The Bates Number will generally be set up to be generated by a custom stored procedure. This procedure will run either before IJP or after the barcode is scanned and can be in a different database. If smaller IBML scanners are utilized, more spaces will need to be added to the generated bates numbers so they are sprayed properly.

The scanning device 110 may be configured with high-volume scanning features such as multiple sort pockets, auto batching, pocket water falling, mixed document scanning, multi-feed detection, high capacity full page pockets, mechanical skew detection and correction, and other such features to accommodate the efficient scanning of large volumes of petition documents or other such documents associated with elections services. In some embodiments, the scanning device 110 may include any device equipped with a camera or other image capture technology and capable of generating image data or digital images from an elections document.

In some embodiments, the scanning device can be configured with the Scan Watcher service: a background Windows Service that continuously monitors for scan batches that have not yet been staged in the Vocem system 100. Scan Watcher is the first component of the Vocem system 100 that a scan touches, and its sole purpose is to stage the scan batch for processing by the Page Import Processor. The Scan Watcher has no translation or analysis responsibilities. The Scan Watcher Service should monitor a UNC location for new scan batch metadata files. The initial design will include an implementation for the IBML ScanTrac PostScan XML metadata format. The implementation details of monitoring files are the developers' discretion. While .NET's FILE-SYSTEMWATCHER class is built for such a purpose, it has a lot of complexity that will be unused by Scan Watcher, such as events for Changed, Deleted, and Renamed that may create unnecessary overhead for future developers. It is permissible to implement a simple, repetitive loop to look for new files.

The Scan Watcher Service's primary purpose is to stage the batch and its files without any loss or corruption of either. Therefore, much of the service's work is validating that its staging operation can and does complete successfully, or not at all.

Prior to staging a batch, the Scan Watcher Service may first ensure the XML file is valid and that the top level node is Batch. Then it must ensure that at least one document node exists under Batch and that each document node contains exactly one Images node. Next, it must ensure that each Image node contains exactly one Name node. After doing this, the Scan Watcher Service then moves on to ensuring that each document node contains exactly one Inkjets node, that each Inkjets node contains exactly one Inkjet node, and that each Inkjet node contains exactly one Printline node. The next steps are to ensure that no ScanBatch records exist with the Batchname of the current batch and to ensure that no ImageFile records exist with the file name of any documents in the current batch. The final step is to evaluate the full path of every expected file and ensure that they all exist, none are locked, and that each can be read by the service. If any of these validations fail, the failure should be logged to a location where a supervisor can be made aware, and that the metadata file should be moved to a subfolder in its current location named "Failed". If the validations complete, the ScanBatch and its associated ImageFile records may be passed through the API for persistence in the database. Once the ScanBatch is created, the metadata file should be moved to a subfolder in its current location named "Staged".

As further indicated, the application 102 may have access to a voter registration (VR) database 112 implemented by a third party or government agency. The VR database 112 may store data associated with a list of individuals that are eligible voters in one or more particular localities for use at polling places. In some embodiments, the VR database 112 may include the name, registration information, and a unique identifier for each voter. In some embodiments, the application 102 is configured to monitor, track, and verify petitions by leveraging data accessed from the VR database 112. Data from the VR database 112 may accessed by the application 102 in real time, and/or the VR database 112 may be in operable communication with the application 102. In addition, in some embodiments, the application 102 may access the VR database 112 by executing a call using one or more of a VR application programming interface (API) 114. The VR database 112 may be hosted remote from the computing device 104 or whatever device is implementing the application 102, or otherwise.

In addition, the application 102 may have access to or be in operable communication with a SQL database 115. The SQL database 115 may store metadata associated with operations of the application 102, such a queries, and historical data. The SQL database 115 may further store and retrieve data requested by the application 102, and store information about users of the application 102.

As further shown and described herein, the application 102 may include functionality to configure a computing device to create, manage, validate, and process digital documents such as petitions, and may accommodate more efficient and improved extraction and access of information from a scanned image of an election document. In some embodiments, the application may utilize or define one or more templates which may comprise digital predefined forms, implemented in e.g., JSON or XML, configured to map image data from a scanned image of an election document, and each template may accommodate the validation of different petition types. Accordingly, in some embodiments, the computing device 104 and/or the application 102 may be in communication with a petition template database 116, storing one or more of the templates 118 for use as desired. In some embodiments, multiple instances of the template database 116 may be created for specific local environments, such that one polling precinct may have access to a first instance of the template database 116 and a second polling precinct may have access to a second instance of the template database 116. In other embodiments, the templates 118 may be provided or otherwise stored by the application 102 (e.g., stored in a cloud hosting the application 102). The template database 116 is not limited to a separate database as shown, and in other embodiments, the templates 118 and related information may be stored within memory (within a file or more general repository) of the computing device 104, as in the case where the computing device 104 defines one or more servers.

Further, at least some features of the application 102 may be made available to a plurality of user devices 120 in communication with the computing device 104 of the system 100 and/or the local computing device 108 via the network 106. The plurality of user devices 120 may include, without limitation, a controller, a personal computer, a terminal, a workstation, a portable computer, a mobile device, a tablet, a phone, a pager, and a multimedia console. The plurality of user devices 120 may be accessible to or associated with administrators, elections officials, or other such users. For example, using one or more of the user devices 120, an elections administrator may log-in to aspects of the application 102 to view sampling results of a petition process.

Figure 1B:
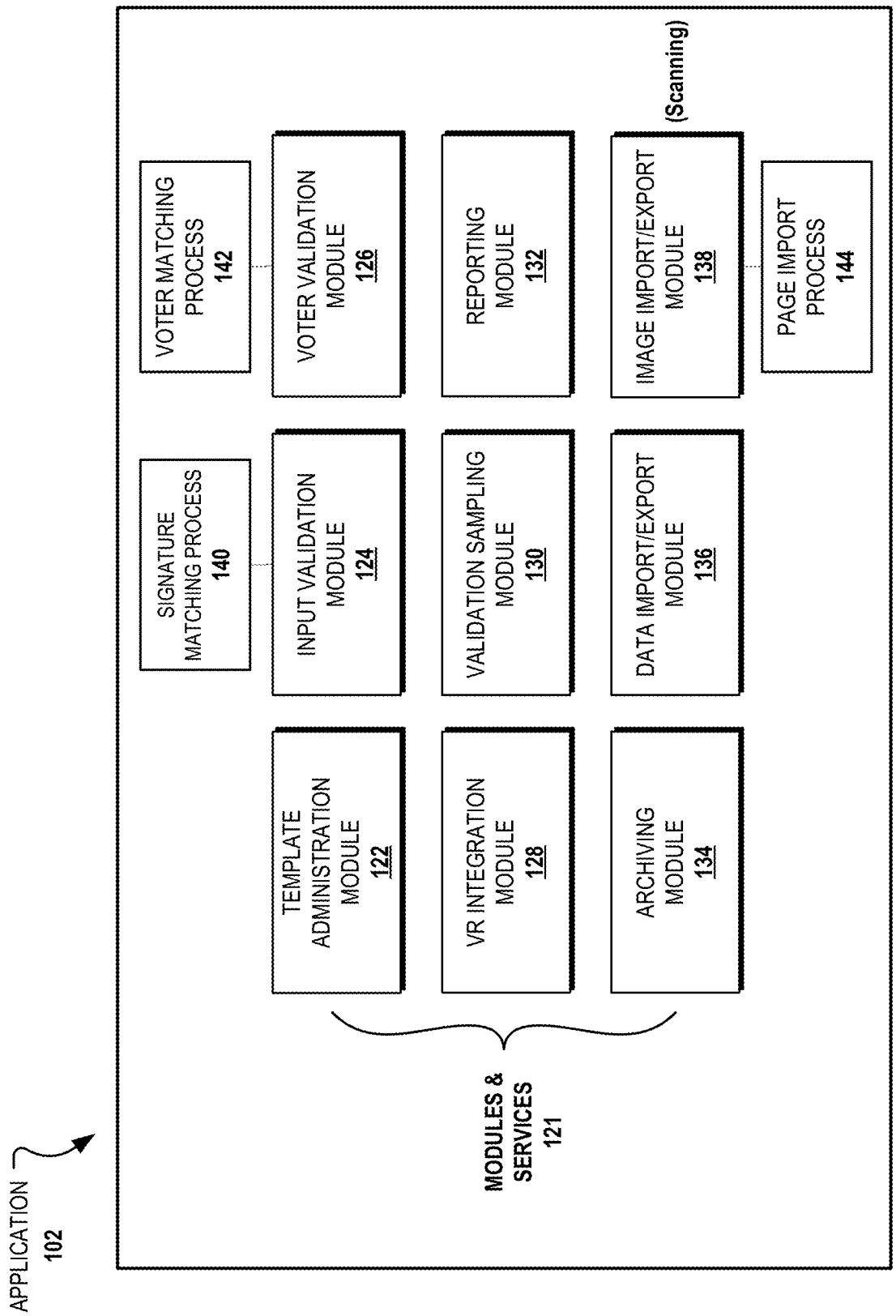
FIG. 1B is an application stack illustrating possible modules and associated processes of an application deployed with the computer-implemented system of FIG. 1A for implementing functionality associated with validation, verification, and management of election documents.

Referring to FIG. 1B, the application 102 may include or be implemented with a plurality of different modules, services, and associated processes as shown, unique for functionality associated with scanning documents, identifying features of the documents, validating data associated with the documents, and the like. For example, the application 102 may include a template administration module 122, an input validation module 124, a voter validation module 126, a VR integration module 128, a validation sampling module 130, a reporting module 132, an archiving module 134, a data import/export module 136, and an image import/export module 138. The modules or services may collectively define the modules and services 121 of the application 102 as shown. In addition, the input validation module 124 may be configured to execute a signature matching process 140, the voter validation module 126 may be configured to execute a voter matching process 142, and the image import/export module 138 may be configured to execute a page import process 144 and otherwise scan documents and generate image data. These modules and services 121 are described in greater detail throughout the present disclosure, and relate to non-liming exemplary modules and services of the application 102 for executing the functionality of election document processing described herein. As further described herein, each of the signature matching process 140, the voter matching process 142, and the page import process 144 may be executed and run in parallel using one processor or device or across multiple processors.

In some embodiments, each of the modules and services 121 may be modular in form and functionality. Specifically, as illustrated e.g., in FIG. 1E and FIG. 1F, modules and services 121 and related processes may define modular components that may be plugged in or out of the overall application 102 or may be implemented as desired depending upon the implementation and system requirements for a particular target environment. In other words, the modules and services 121 may each define an "iservice" that can be flexibly implemented, edited, or removed as needed depending upon the unique specifications or predefined requirements for a given implementation or deployment. For example, a first county may have no preexisting scanning systems, and the application 102 may be implemented using the import/export module 138 to generate image data from documents associated with the first county. Conversely, a second county may be pre-equipped with systems for generating image data of scanned election documents, such that the import/export module 138 may be omitted when the application 102 is deployed with the second county in order to accommodate an integration that considers the preexisting architecture and systems that may already be deployed for the second county. In this manner, the application 102 is highly modular and flexible in its implementation and facilitates easier integration with existing systems associated with voting precincts. In one embodiment, at least one of the modules and services 121 may comprise a microservice.

Figure 1C:
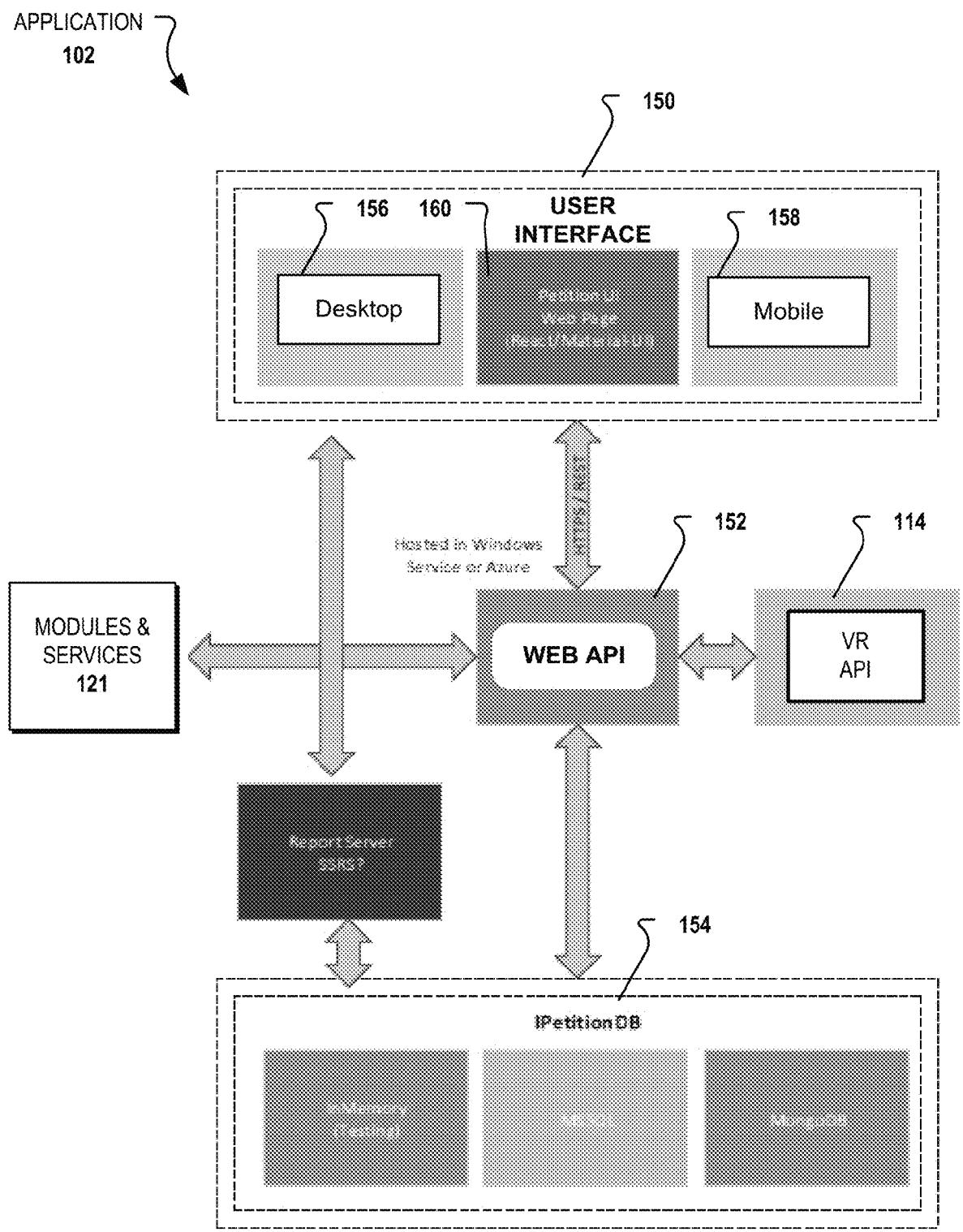
FIG. 1C is a simplified block architecture diagram illustrating relationships between the modules of FIG. 1B, a user interface (UI), a web API, and a database.

Referring to FIG. 1C, the application 102 may further define or otherwise have access to a user interface 150, a web API 152, and an election services database 154. In general, an end-user, such as an elections administrator (implementing one of the user devices 120), may utilize the user interface 150 to access aspects of the modules and services 121 and the database 154 by leveraging calls or other functionality of the web API 152. As indicated, in some embodiments the user interface 150 may take different forms, and may be configured as a desktop application 156 to enable access directly from a desktop, a mobile application 158 to enable access via a mobile device, or the user interface 150 may be accessible via a browser or webpage, illustrated as web page UI 160.

As indicated, the web API 152 may be implemented to provide access to the modules and services 121 of the application 102. In some embodiments, the web API 152 leverages REST and HTTP functionality to communicate with the user interface 150. The database 154 may be a MS SQL database, and may further include inMemory or testing, and a MongoDB. The web API 152 may further be in operable communication with the VR API 114.

Referring to FIG. 1D, possible layers of the web API 152 are illustrated for additional explanation to better describe a user's interaction when accessing the web API 152 via the user interface 150 or otherwise. As indicated, the web API 152 may include an authentication layer for verifying that a token of a user is valid. Under a permissions layer, the web API 152 may verify whether the user has access to the web API 152 or other APIs and specific actions. Under a sanitize layer, the web API 152 may filter out certain characters to help prevent SQL or JavaScript injection. Under a validation layer, the web API 152 executes certain predefined business rules for validating fields of a scanned election document. Under a Data Access layer, the web API 152 stores and retrieves data. A Logging/Auditing layer of the web API 152 may log all actions including possible failures.

In this context, auditability is narrowly defined as the capability to track and log data modification transactions as they occur in the database tables, either directly through a database management tool (e.g. SQL Server or Management Studio) or through a business application. The audit feature in Vocem is designed to meet the business need of tracking data changes while minimizing performance impact. The solution can be reconfigured "on the fly" to suit customers' changing audit needs.

Audit data is stored in the VocemAudit database separate from the transaction database, Vocem. There is a corresponding audit table in VocemAudit for each transaction table in Vocem that is designated for audit. Audit is achieved with SQL Server DML (data modification language) triggers programmed into all tables that are targeted for auditing.

Three triggers are used to capture INSERT, UPDATE, and DELETE, respectively. When a new record is inserted or after an existing record is updated, the entire record is inserted into the corresponding audit table along with user name, time stamp, and the type of transaction (I for insert, U for update). When a record is deleted from a transaction table, the deleted record is inserted into the audit table along with user name, time stamp, and transaction type (D for delete). Table truncation will not result in audit records. The triggers are coded such that their behavior can be configured through. Configuration changes take effect immediately.

Figure 1E:
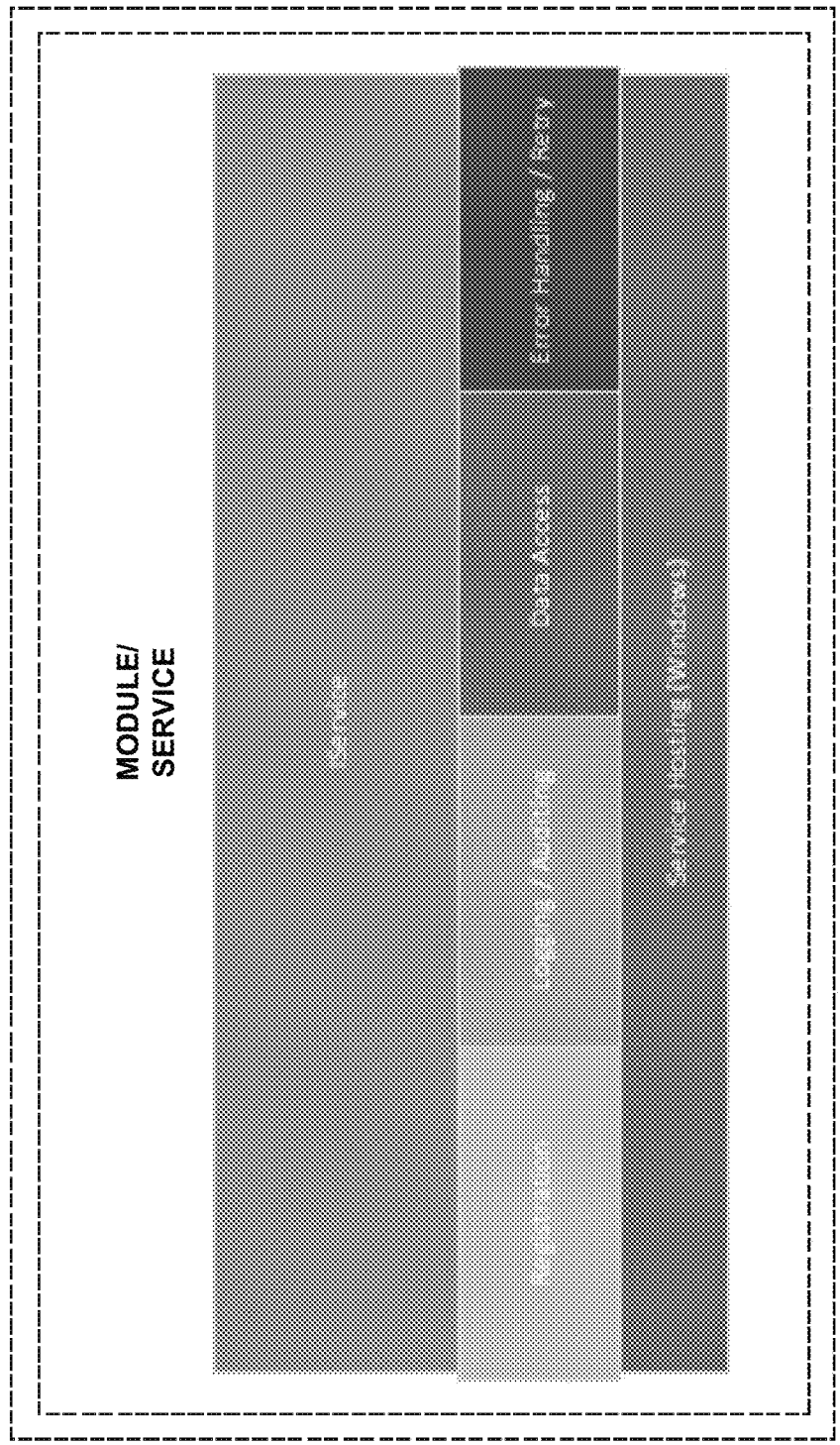
FIG. 1E is a simplified block diagram illustrating possible components of any one of the modules or services of FIG. 1B.
Figure 1F:
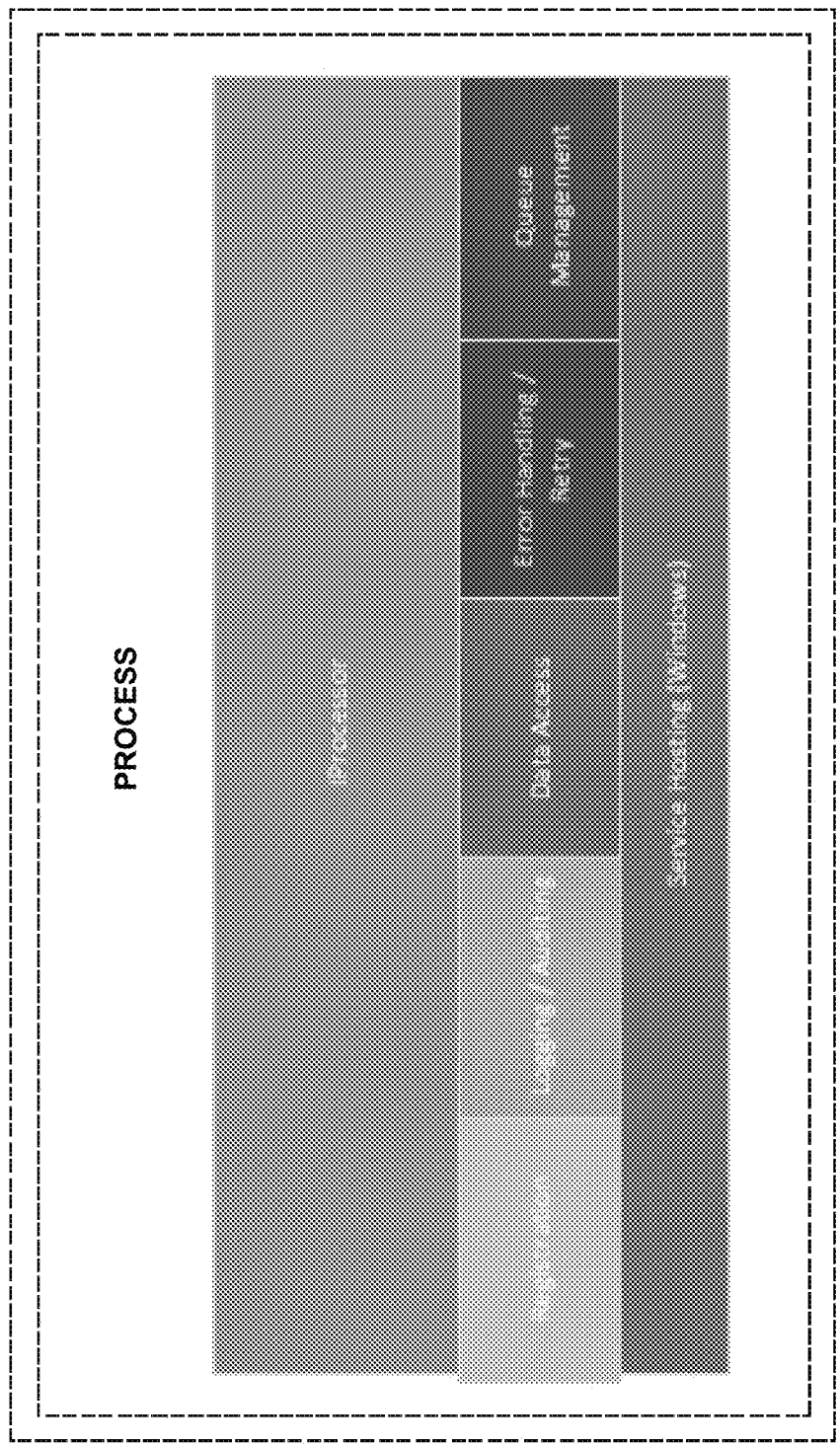
FIG. 1F is a simplified block diagram illustrating possible components of any one of the processes of FIG. 1B.

Referring to FIGS. 1E and 1F, possibly layers or features of the modules and services 121 and processes are shown. For example, any one of the modules and services 121 may include functions for registration, logging/auditing, data access, error handling, and service hosting layers. In this manner, the application 102 provides election document processing services on top of a shared and modular service/module base, comprises of the modules and services 121. This structure allows developers to edit and build new ones of the modules and services 121 by creating a class that implements the "iservice." Processes may include layers or functionality similar to the modules and services 121. As described herein, the modular nature of the modules and services 121 accommodates flexibility during deployment and implementation of the application 102 for different environments.

Figure 1G:
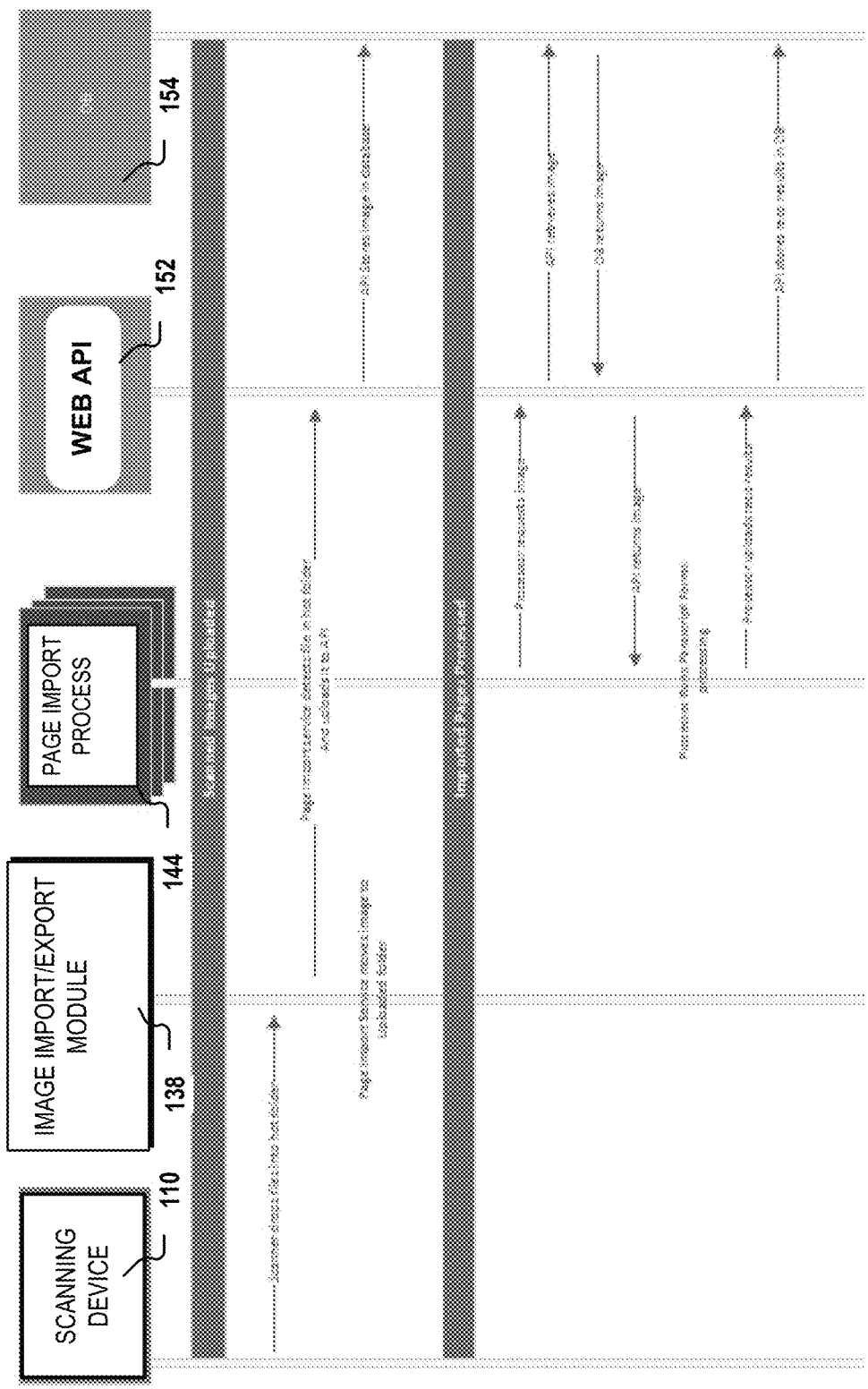
FIG. 1G is a simplified block diagram illustrating processing steps of a document associated with elections.

Referring to FIG. 1G, a non-limiting application state diagram associated with the application 102 is shown for further illustrating possible image scanning of election documents and associated processing. As indicated, scanned images of election documents from the scanning device 110 are made available to the image import/export module 138. In some embodiments, the image import/export module 138 then makes the scanned image data available to the web API 152, and the scanned images may further be stored in the database 154. Using the page import process 144 or other functionality described herein, scanned images may be retrieved from the database 154 and processed.

Figure 1H:
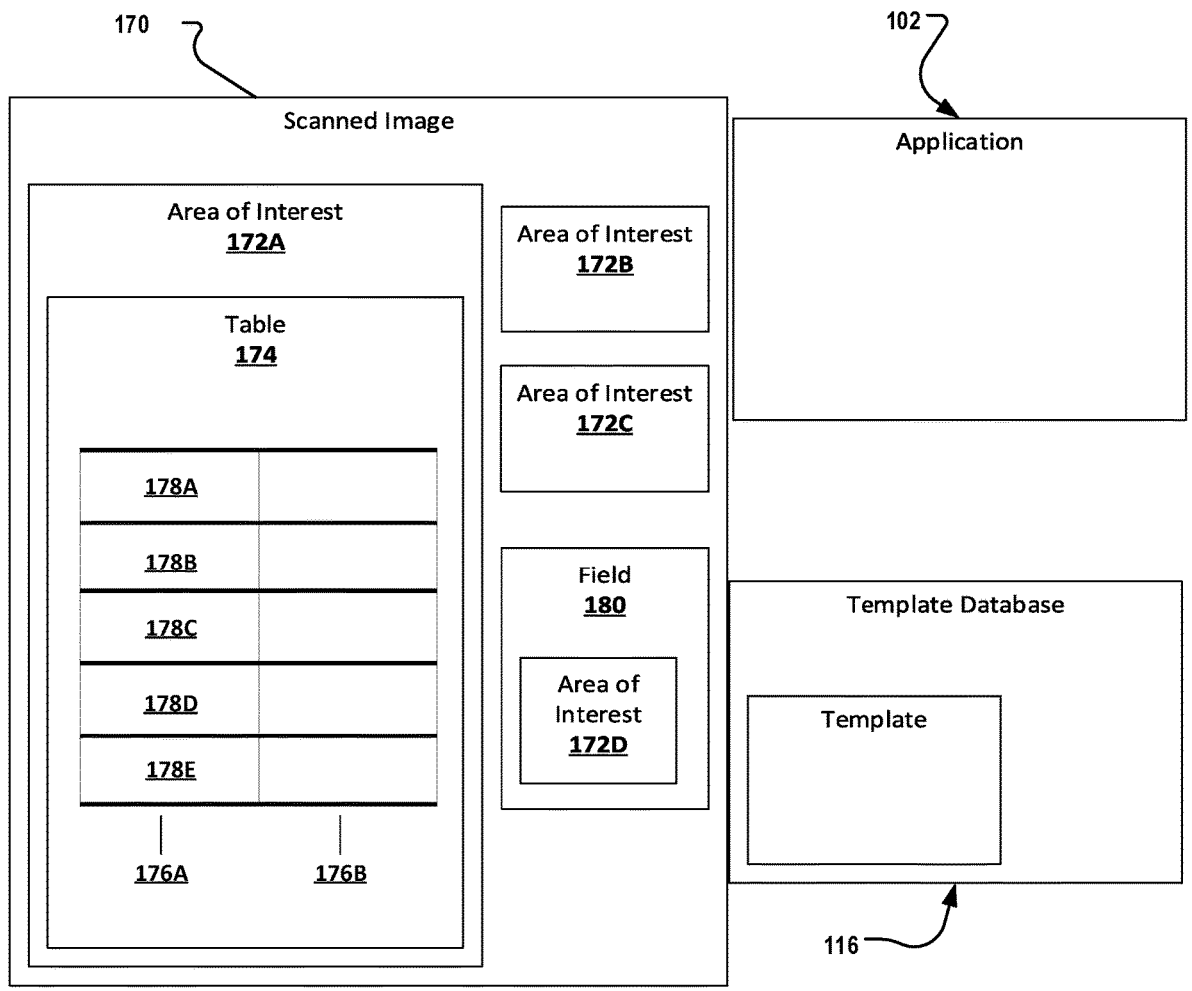
FIG. 1H is a simplified block diagram illustrating the application of a template or other functionality for identifying areas of interest of a scanned election document for processing.

Referring to FIG. 1H, an exemplary scanned image 170 of an elections document is shown, for illustrating additional aspects of the templates 118 and other features of the image processing described herein. The scanned image 170 may be in the form of a TIFF file, and may define an elections document type as described herein. Referencing this elections document type, a template 118A may be accessed from the template database 116. The template 118A corresponds to the elections document type and may be informative as to areas of interest 172A-172D of the scanned image 170 that may be processed to useful to identify input information for validation and verification of the document as described herein.

As shown, each of the areas of interest 172A-172D is positioned or mapped along a particular location of the scanned image 170. The template 118A is configured to inform the application 102 about the areas of interest 172A-172D and their associated locations because the template 118A is designed to accommodate efficient identification of information from a scanned election document having the elections document type. In the example shown, the area of interest 172A identifies a general area of the scanned image 170 where a table 174 is located. For illustrative non-limiting purposes only, the table 174 includes a first column 176A, a second column 176B, and five rows 178A-178E. In the case where the scanned image 170 is a petition, the rows 178A-178E of the table 174 may relate to rows of a petition document. As further shown, the area of interest 172D is generally positioned over a field 180. The field 180 may define a document identifier, or other information desirable for access from the scanned image 170.

In use, as further described herein, the template 118A may accommodate the application 102 to efficiently refer to the specific locations of the scanned image 170 represented by the areas of interest 172A-172D to validate and verify information of the table 174 and/or the field 180. More specifically, each of the areas of interest 172A-172D may define a set of feature values including specific column and row pairs of pixels represented by such portions of the scanned image 170. So, for example, where it is desired to determine if the field 180 is populated or empty, the feature values specific to the area of interest 172D may be applied to one or more predetermined functions to determine whether any characters populate the field 180 of the scanned image 170. In some embodiments, optical character recognition may be leveraged to process the area of interest 172D and determine whether any characters occupy the field 180. Similar functionality may be applied to the table 174 by processing the areas of interest 172A, 172B, and/or 172C.

In some embodiments, the areas of interest 172A-172D may be analyzed to determine whether an undesired amount of white space is present in the scanned image 170, or whether image data associated with the areas of interest 172A-172D of the scanned image 170 indicates crossed-out words or characters. Excess white space or crossed-out language may, for example, constitute a violation of a jurisdictional rule associated with an elections document. The areas of interest 172A-172D and rules may be specified in the template 118A in any such manner to improve the efficiency of processing the scanned image 170 and consideration of the underlying elections document from which the scanned image 170 is created. In some embodiments, a predetermined threshold may be defined by the template 118A that specifies a minimum number of fields of the document associated with the scanned image 170 that must be populated in order to accept the document for further processing.

Figure 2A:
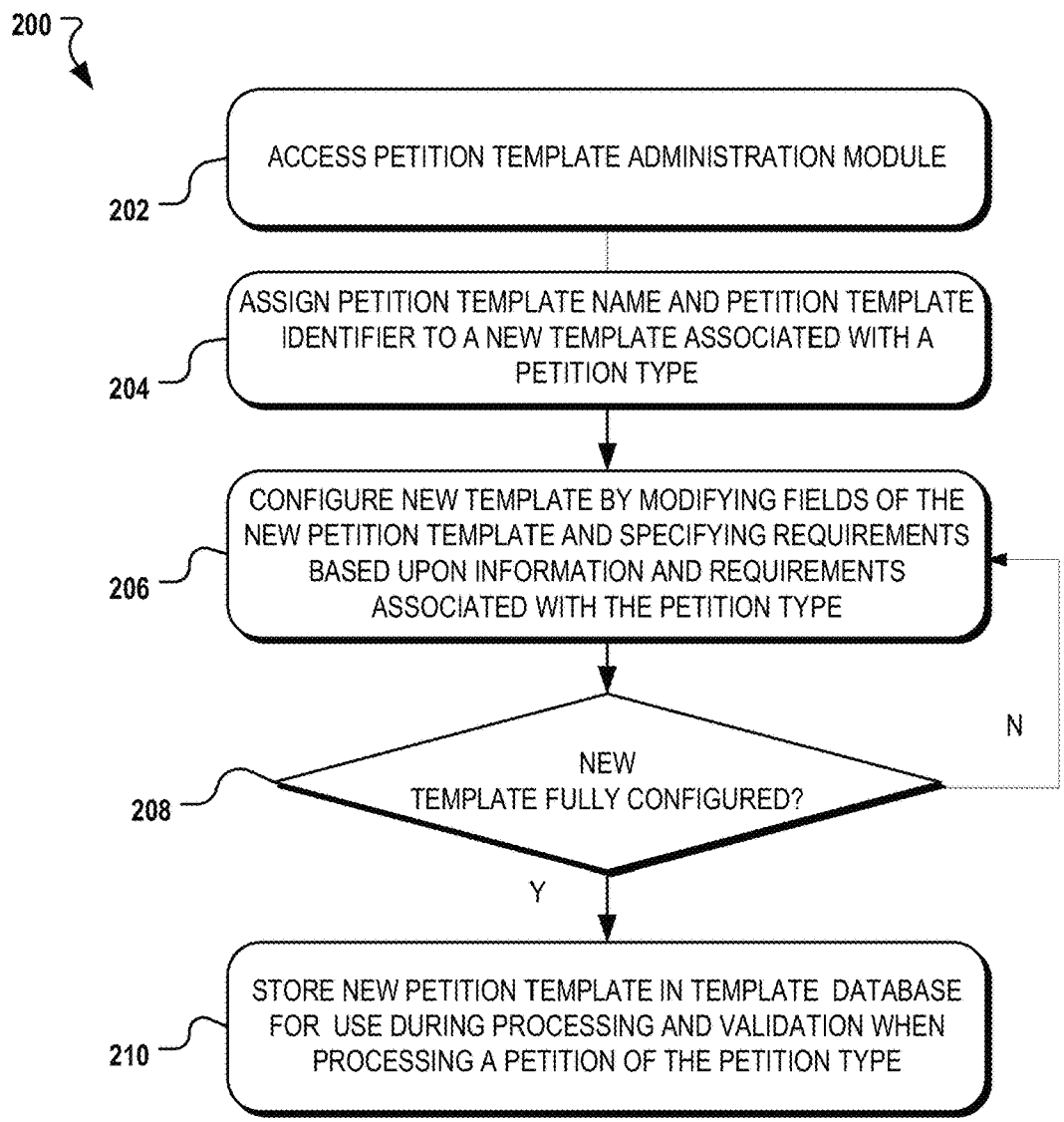
FIG. 2A is a simplified block diagram of a flow chart showing an exemplary process flow for creating a petition template.
Figure 2B:
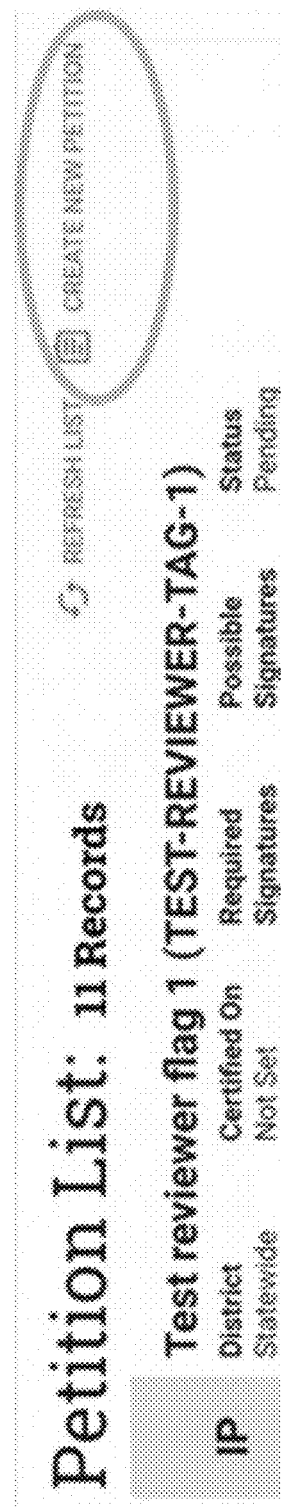
FIG. 2B is an application screenshot illustrating functionality for creating the new petition template as described herein and referenced by FIG. 2A.

Referring to FIGS. 2A-2D and process flow 200, with reference to FIGS. 1A-1G and in particular FIG. 1H, the application 102 of the system 100 is configured to accommodate the creation of the templates 118, using e.g., the user interface 150 and the template administration module 122. The steps of FIGS. 2A-2D illustrate one example where the creation of templates 118 are utilized to process scanned images of petitions, but it should be appreciated that the features described in this context may apply to the creation of templates for the processing of scanned images associated with ballots, or any other elections documents. Referring to block 202, a user interacting with the application 102 for the purpose of creating a new template for a new petition type may first access the user interface 150 shown in FIG. 1C from e.g., one of the plurality of user devices 120 or from the local computing device 108. By interacting with the user interface 150, the user may navigate to a template administration window or tab (example shown as "Petition Administration" in FIG. 2B) of the user interface 150, and may request to create a new template which may ultimately leverage the template administration module 122 as described herein. As shown in FIG. 2B, the template administration module 122 may be accessed from a list, drop down box, or other such display feature of the user interface 150. From there, the user may select "New" from the list, which generates the display window illustrated in the screenshot of FIG. 2C.

Figure 2C:
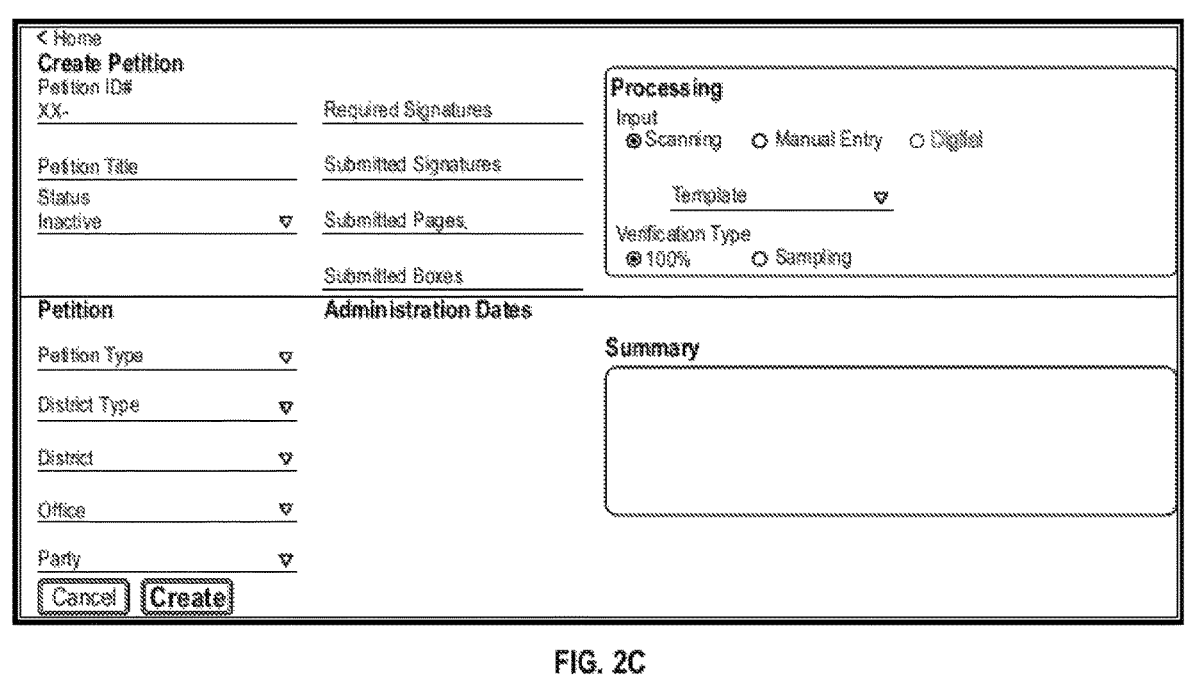

Referring to block 204 and the display window of the user interface 150 illustrated in FIG. 2C, the new petition template, to be created for use with the new petition type, may be assigned a petition name and a petition identifier (associated with a petition type) by user data input to fields shown, including a "Petition ID" and a "Petition Name" field. The petition identifier may include a set of characters or code unique to the new template and may define a petition type. The petition name may include an actual name or some reference to the petition type, and may be useful for identifying the petition type and/or its contents.

Figure 2D:
FIG. 2D is an application screenshot illustrating view and edit functionality for a petition template.

Referring to block 206, with reference to FIG. 2D, the new template may be configured by modifying and/or specifying validation fields of the new template or otherwise adjusting requirements for future use of the new template. The validation fields may be selected to identify or track data input for any relevant information required for processing a petition in a given jurisdiction. For example, the user may adjust validation fields to require a signature for petitions that are processed using the new template, and/or may require that a birthdate be provided for validating a petition using the new petition template. In some embodiments, the validation fields may include, or otherwise require input data when using the template that comprises: a petition status (defining whether the petition is active or inactive), a petition type (e.g., purpose of petition), a petition jurisdiction, a legal title, a full text or natural language window, a request submit date, a request receive date, a legal release date, a petition deadline date, a petition next election date, a circulator name, a petition serial number, and the like.

In addition, the new template may be configured such that the validation fields correspond with areas of interest (e.g., areas of interest 172A-172D) associated with predetermined locations of a scanned image of a new petition. In other words, the user may specify in the new template where data associated with selected validation fields should be located in a subsequently scanned image associated with a petition having the same new petition type. For example, the new template may be configured to recognize data along a lower right portion of a scanned image as generally belonging to a signature, or other field.

In some embodiments, the new template may be configured with required validation fields, such that when the new template is applied to or otherwise used with a given scanned image of e.g., a petition, the required validation fields must be completed in order to fully process and consider the petition for reporting or other applications. In other words, the scanned image of a new petition must include information for populating each required validation field. Assignment or specification of these required validation fields may affect how the application 102 scans or validates scanned images of new petitions. In some embodiments, the user may specify where these required validation fields are arranged along the new template, using pixel rows and columns. For example, the new template may include a required validation field of a voter name, and this required validation field may be defined along a predetermined pixel row and column set. In this manner, when the new template is applied to scanned images, the new template be used to verify whether such scanned images include a voter name along the predetermined pixel row and column set or predetermined location of the scanned images.

Referring to the decision block 208, in some embodiments, the template administration module 122 may display a prompt to the user (not shown) or request from the user whether the new template has been fully configured. Referring to block 210, assuming the new template has been fully configured, the new template, associated with the new petition type, may be stored in the template database 116 for future use. For example, when a petition of the new petition type requires validation by the local computing device 108, the local computing device 108 may apply the new template to validate the petition, as further described herein. The new petition created may later be accessed as needed from authorized users defined by the application 102.

Referring to FIGS. 3A-3I and process flow 300, with reference to FIGS. 1A-1G, the application 102 of the system 100 is further configured to validate elections documents by processing scanned images of the elections documents according to predefined rules which may include leveraging voter registration data. The steps of FIGS. 3A-3I illustrate one example for processing scanned images of petitions, but it should be appreciated that the features described in this context may apply to the processing of scanned images associated with ballots, or any other election documents. The application 102 is suitable for validating and/or verifying petitions of any number of petition types, by leveraging the templates 118 associated with predefined petition types, such as the new petition template previously described. For purposes of illustration, the following steps of the process flow 300 will reference and be directed to the non-limiting example of validating a sole new petition having the new petition type described in FIGS. 2A-2D. However it should be understood that the following functions may equally be applied to other petition template types, and that multiple or even voluminous amounts of new petitions may be processed or validated by leveraging the functionality of the application 102 described herein.

Referring to block 302, the local computing device 108 may access a new petition to be processed, and scan the new petition (or a plurality of petitions) using the scanning device 110 to create a scanned image of the new petition. It should be understood and appreciated that the scanned image may also be pre-scanned by an end-user at an elections center, and the scanned image may merely be transmitted or otherwise made accessible to the application 102. The new petition may comprise one or more pages, and may include front and back pages depending upon the petition type. Accordingly, the scanned image may include image data associated with one or more pages of the new petition.

Figure 3A:
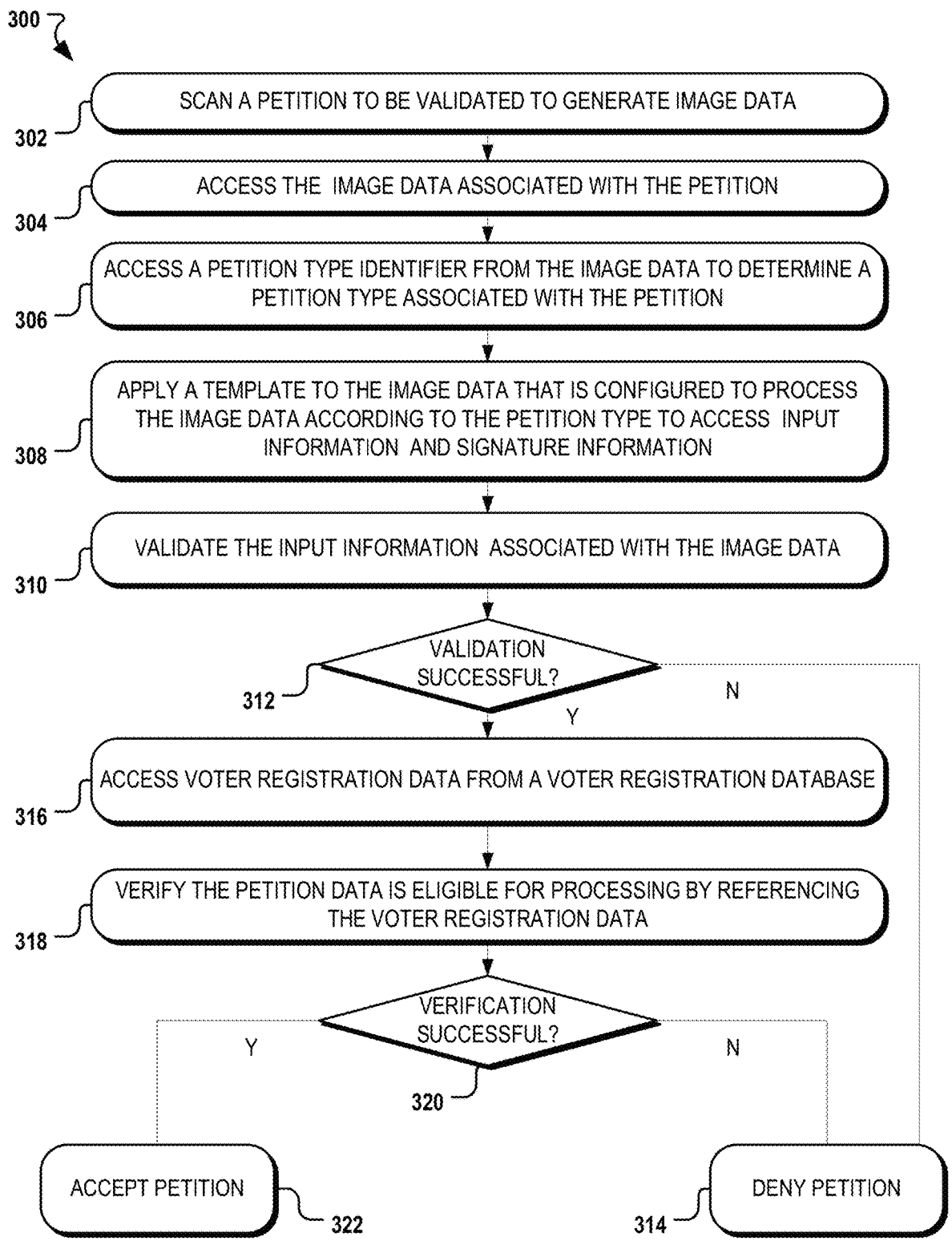
FIG. 3A is a simplified block diagram of a flow chart showing an exemplary process flow for processing a document associated with elections, such as a new petition.
Figure 3B:
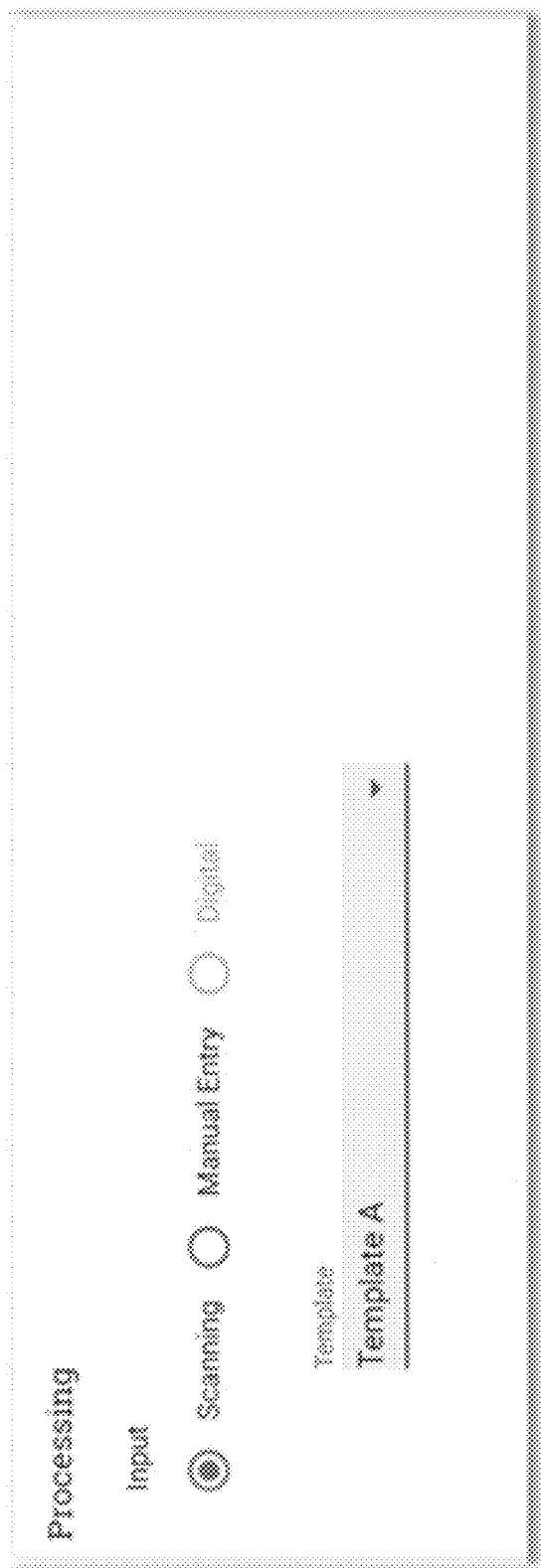
FIGS. 3B-3I are application screenshots illustrating display features and functionality for petition validation and verification as described herein and referenced by FIG. 3A.
Figure 3C:
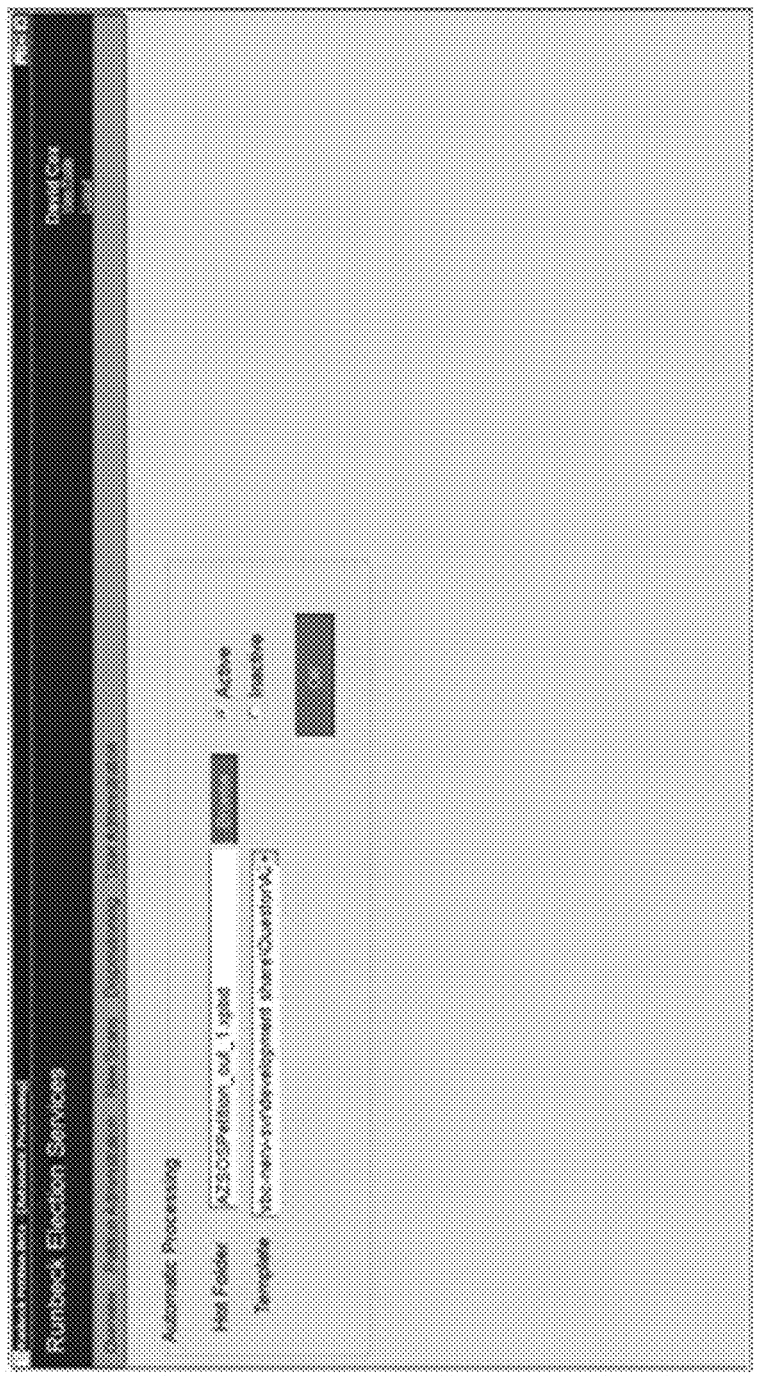
Figure 3D:
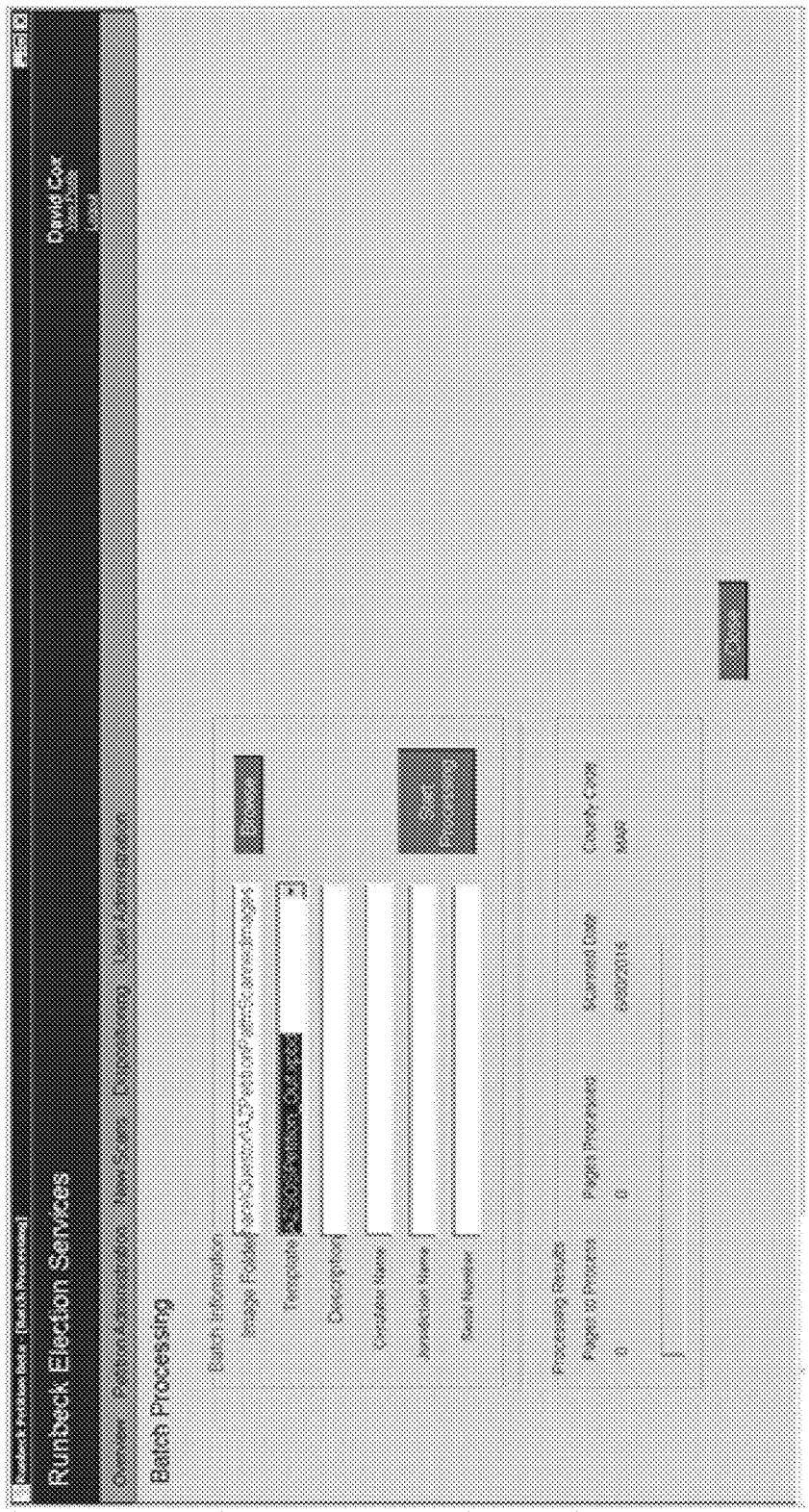

In some embodiments, as shown in FIGS. 3B-3D, once pages (e.g., front and back) of the new petition are received as scanned images and ready to be verified or validated, the petition pages may be processed and interpreted in various ways. For example, the petition pages may undergo automatic processing where scanned images are imported for access by the local computing device 108. Under automatic processing, once the scanned image of the new petition is imported, the application 102 identifies the petition type, and eventually applies the new template according to the subsequent validation steps described herein. In other words, the application 102 is configured to adapt processing and validation of the new petition according to the specifications of the scanned new petition and the new petition template. In other embodiments, the petition pages may undergo batch processing where a batch file may be uploaded or accessed from the scanning device 110 or otherwise, which includes a plurality of scans to verify. In some embodiments, scanned images of the new petition pages may be generated in Tagged Image File Format (TIFF), or other suitable formats. The scanned images of the new petition pages may be sent to or stored within a folder of a local memory associated with the local computing device 108. In some embodiments, the scanned images are sent directly from the scanning device 110 to the local computing device 108.

Referring to block 304, once a scanned image or scanned images of the new petition are generated or accessed, the application 102 is configured to convert, extract, or interpret image data such as feature values or picture elements of each scanned image associated with the new petition. The feature values of each scanned image of the new petition may define finite sets of digital values, or pixels. In other words, each scanned digital image may contain a fixed number of rows and columns of pixels. These pixels may be stored in memory by the application 102 in map-form, or a two-dimensional array of small integers. In either case, the pixels of each scanned image of the new petition are made available to the application 102 for access, analysis, and processing as further described herein.

Referring to block 306, the application 102 may be configured to identify the petition type of the new petition (and consequently utilize the new petition template) in different non-limiting ways. For example, in some embodiments, a file associated with scanned images of the new petition may be generated by the scanning device 110 or otherwise and the file may contain the new petition type or a new petition type identifier in some form, or the new petition type identifier may be assigned within the file header or in metadata associated with the file of the scanned petition image. In other embodiments, the application 102 may be configured to extract the petition type identifier from the picture elements of the scanned petition image.

Referring to blocks 308 and 310, the new template associated with the petition type identifier accessed in block 306 may be referenced or applied by the application 102 to validate and/or verify input information extracted or accessed from the scanned image of the new petition. As described herein, the template may be applied to scanned petition image data to output validation information useful for determining whether a petition associated with the scanned petition image should be considered or recorded. As described in FIG. 1H, the new template may correspond to the petition type of the new petition and define areas of interest of the scanned image/s of the new petition for processing.

Further, in some embodiments, the new template may define or be associated with one or more validation functions that may be applied to data of the scanned petition image representative of the areas of interest to validate fields of the scanned petition and determine (i) whether the fields of the scanned petition have been populated according to the new template; and (ii) whether the information associated with each field can be interpreted or otherwise satisfy certain predefined rules.

By way of a specific non-limiting example, data associated with a scanned petition image may define a plurality of digital values, or picture elements, as described herein. In addition, certain picture elements of the scanned petition image may be associated with the areas of interest of the scanned petition where, for example, a populated validation field should be, as defined by the template used for the given petition. The application 102 may be configured to access portions of the picture elements or feature values of the scanned petition image data corresponding to such areas of interest, and apply one or more predefined functions to interpret the data of such areas of interest and determine whether corresponding fields of the scanned petition were filled out, or left blank. In some embodiments, leveraging machine learning, a classifier may be used to which takes as inputs such feature values or other image data associated with the areas of interest and outputs a class. A class in this context may be indicative of a populated field, a partially populated field, a blank field, or otherwise.

In this manner, the application 102 may be configured to e.g., recognize that the upper right hand corner, or other specific area of interest of the scanned image of the petition, should include data associated with the predetermined validation field of a petitioner's birthdate. The new template may further be configured to recognize that validation fields should be arranged along predetermined image locations, and should be positioned with predetermined distances between one another. The application 102 references the information and functions of the new petition template to locate areas of interest of the scanned image of the new petition in order to determine whether the new scanned petition image includes information sufficient to populate each validation field as defined by the new template.

In some embodiments, using similar functionality and image processing, the application 102 may further be operable to detect excess or undesired white space, crossed out portions, and other such abnormalities potentially present within the scanned image(s) of the new petition and positioned along the areas of interest, or otherwise. In some embodiments, any of this initial validation or processing may be assisted by a third party device or application by executing one or more API calls. For example, the application 102 may call a third-party API leveraging a cloud service that specializes in identifying crossed out portions defined by one or more picture elements of a scanned image.

In the decision block 312, assuming each of the areas of interest of the scanned image of the new petition include some information for populating the validation fields of the new template, the validation and verification process may continue. In some embodiments, optical character recognition, or other image processing, may be applied to the areas of interest of the scanned image of the new petition so that the information populating the areas of interest can be applied as input data for a new record of a validated petition database, such as the SQL database 115. This input data defines information regarding the interpreted characters associated with the validation fields.

Figure 3E:
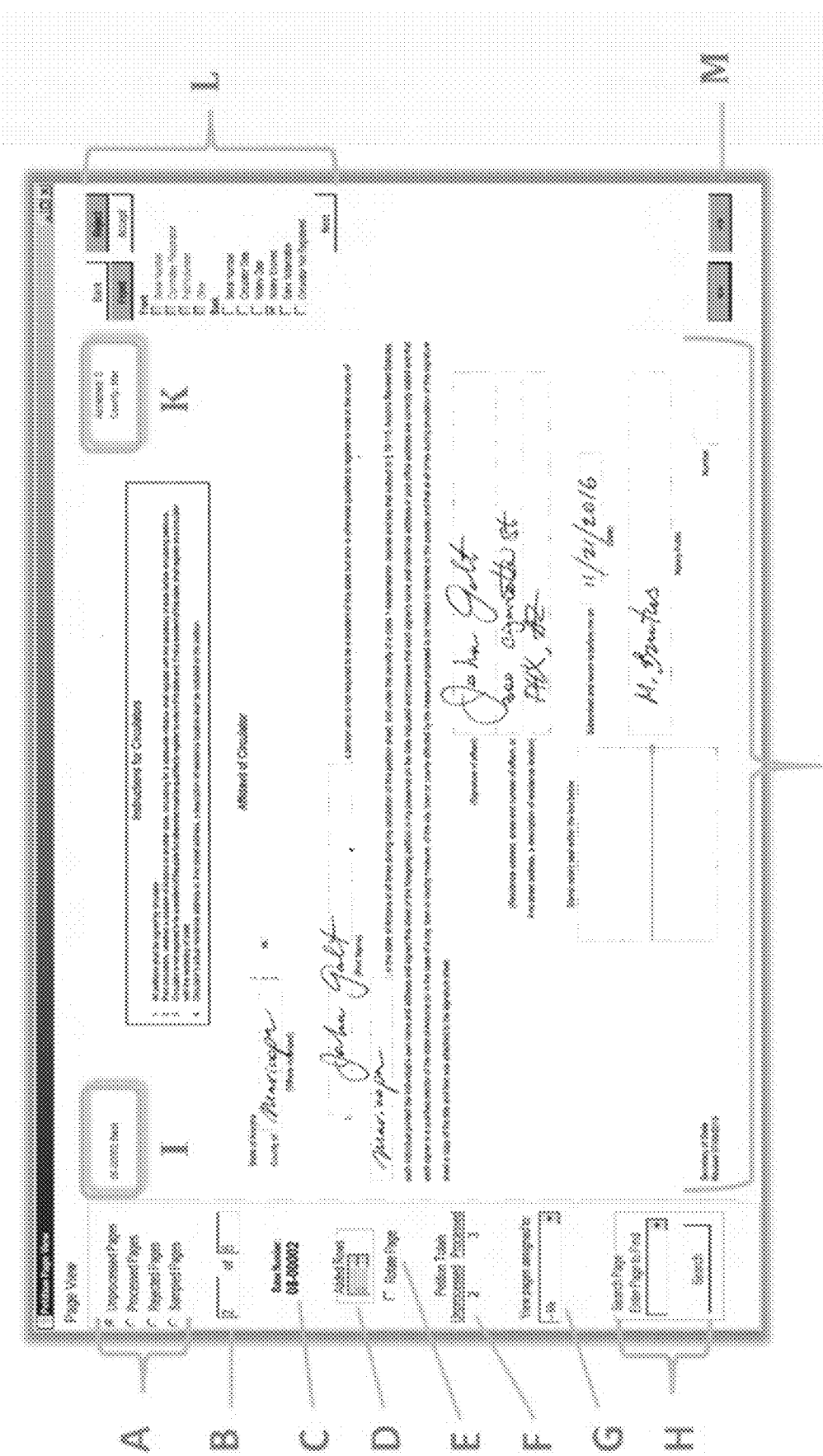
Figure 3F:
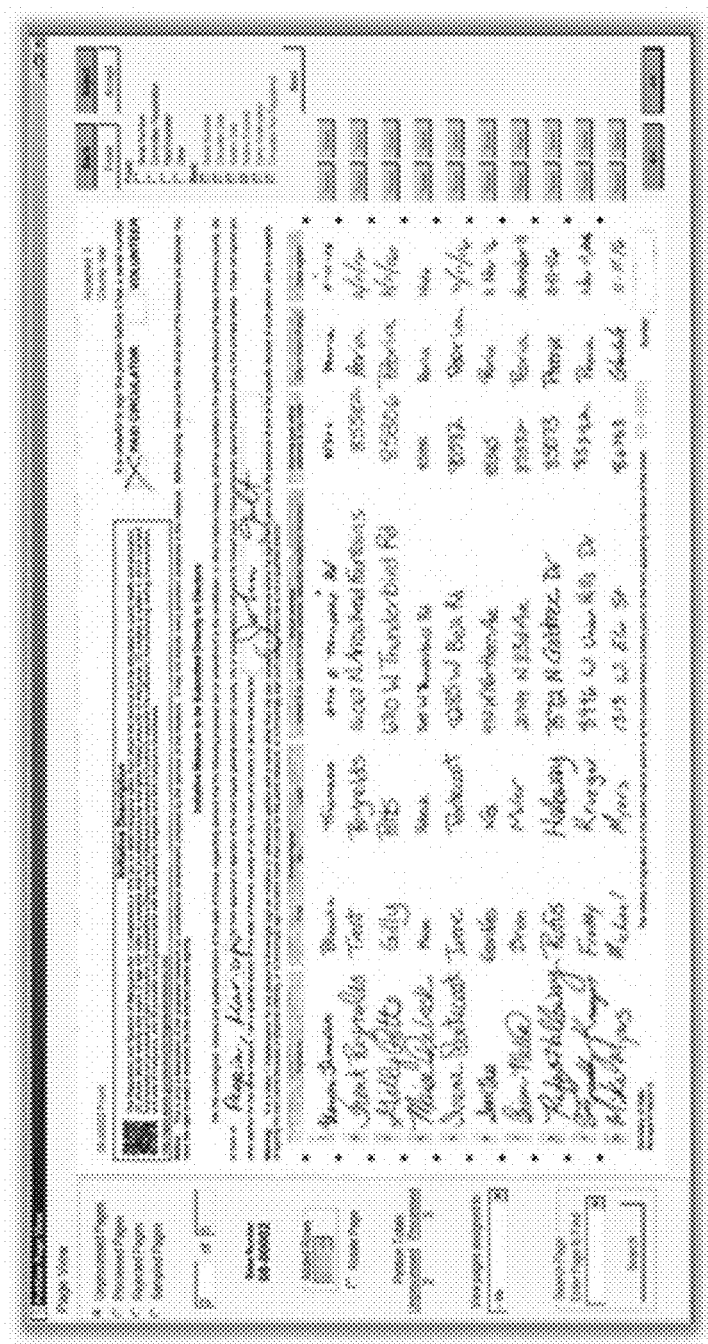
Figure 3G:
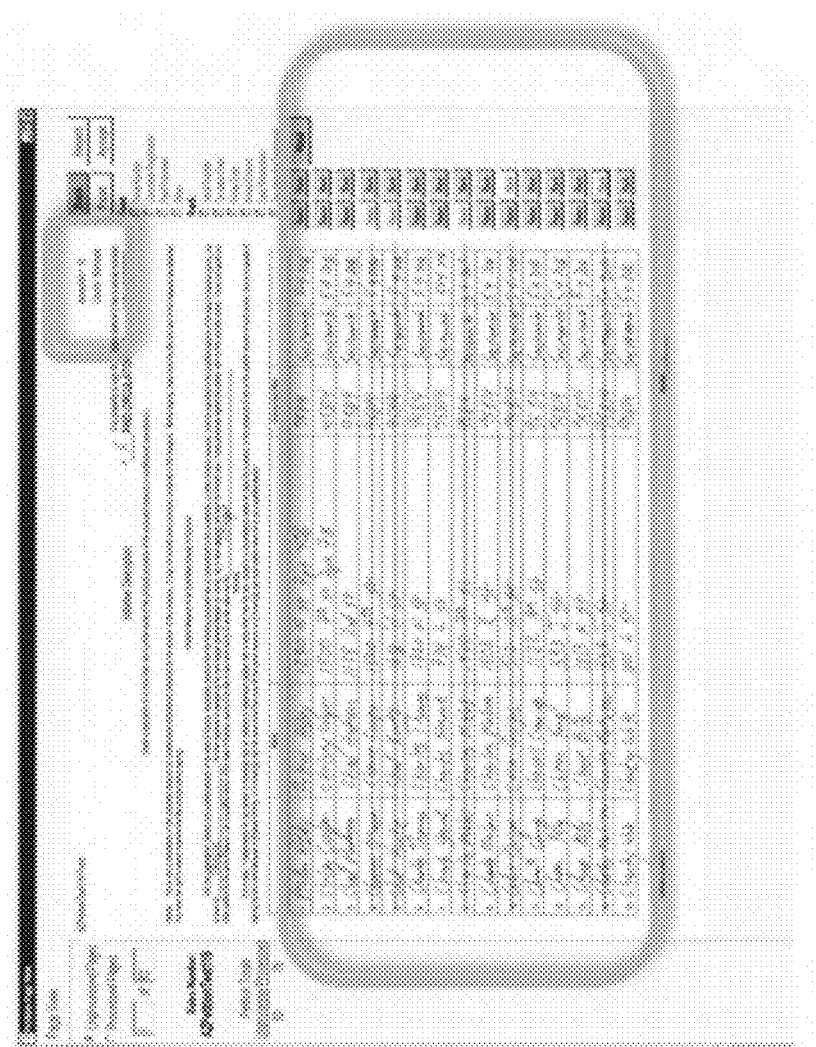
Figure 3H:
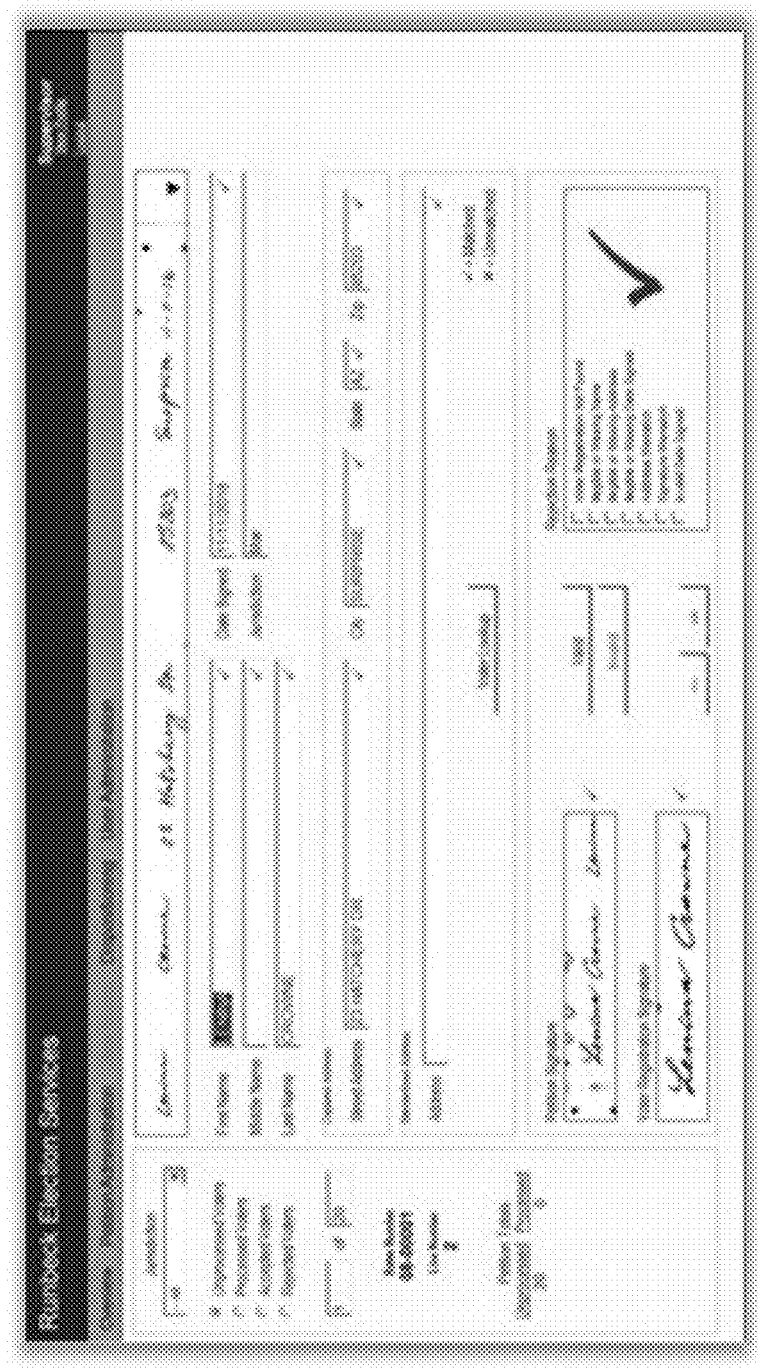
Figure 3I:
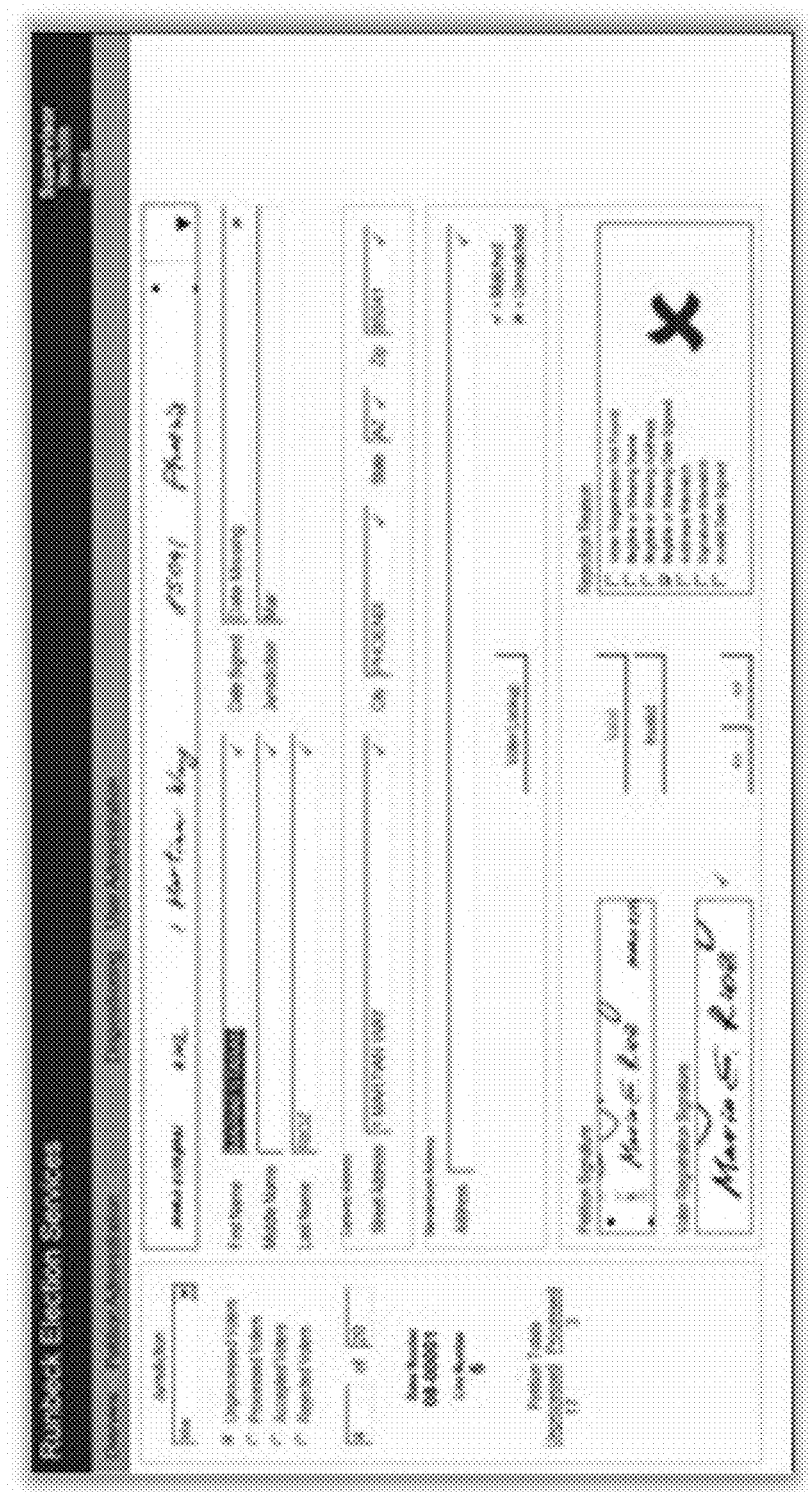
Figure 3J:
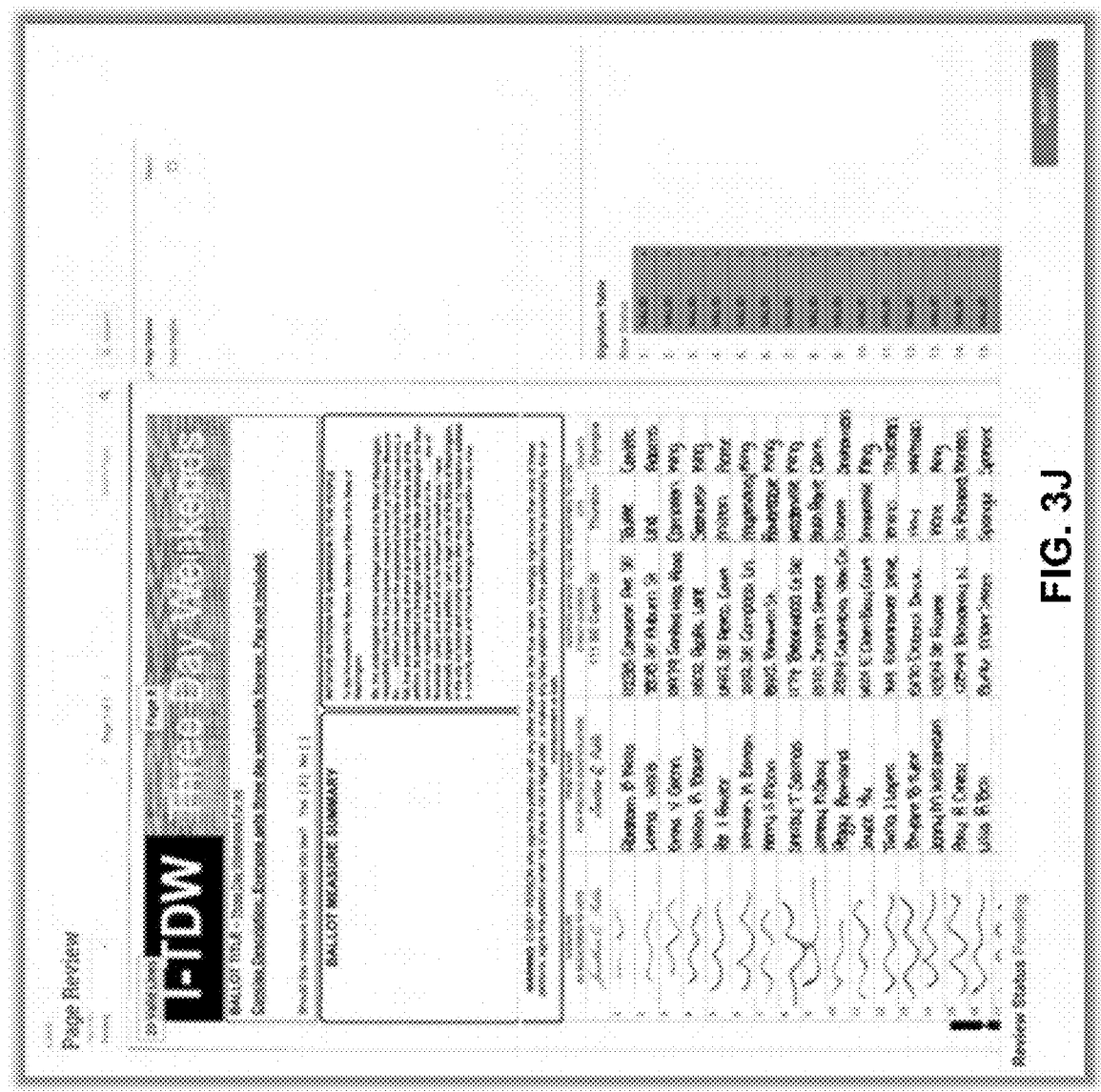
FIGS. 3J-3L are additional application screenshots illustrating display features and functionality for petition validation and verification as described herein and referenced by FIG. 3A.
Figure 3K:
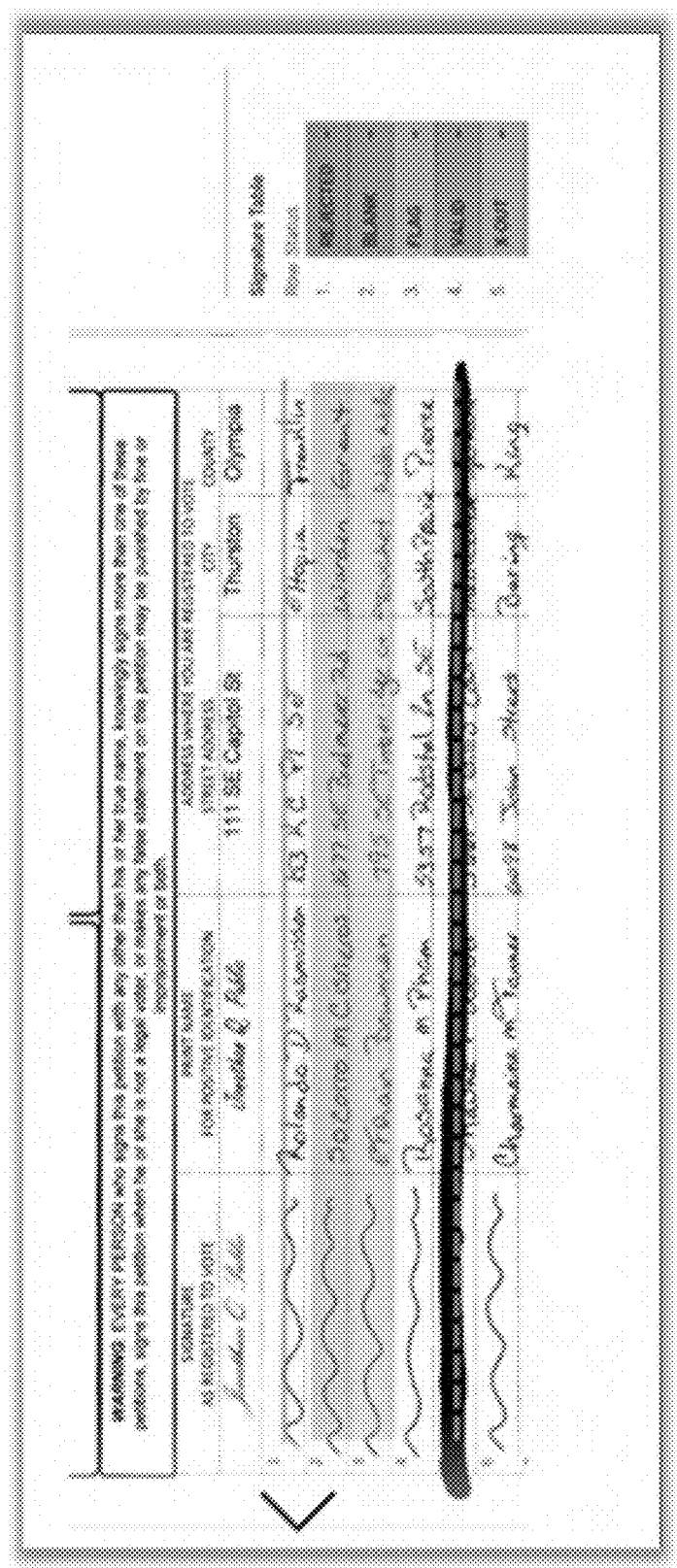
Figure 3L:
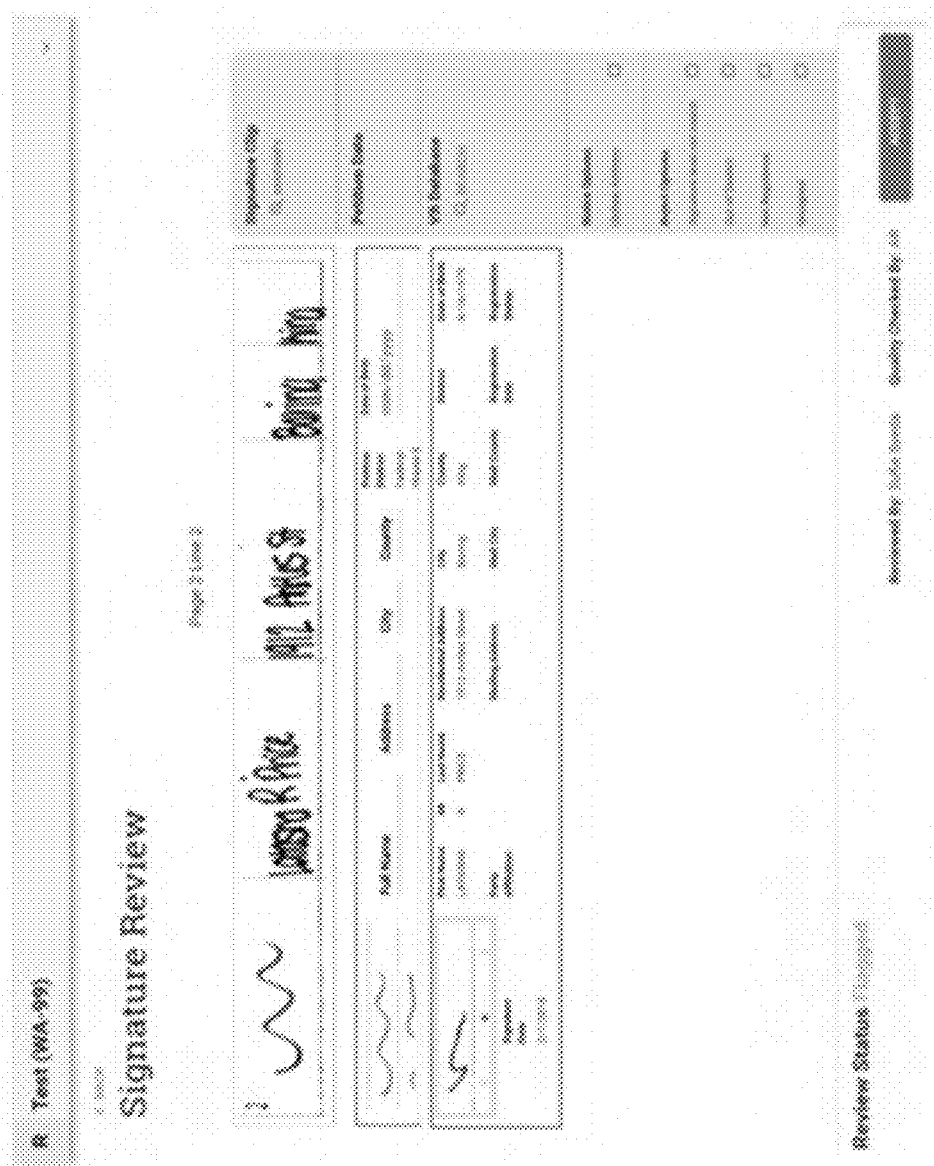

Once petitions are scanned and accessed, the application 102 may enable a user, such as an administrator, to interact with the user interface 150 to manipulate or view certain portions of the scanned image associated with areas of interest/validation fields of a petition as demonstrated in the page view of FIG. 3E. The page view of FIG. 3E illustrates exemplary display and management functionality provided through the user interface 150. In the example shown, Section A of FIG. 3E defines petition pages according to lists associated with processed pages, unprocessed pages, rejected pages, sampled pages, and the like. Section B of FIG. 3E provides a page counter so that the user can graphically track the scanned pages of the new petition. Section C of FIG. 3E displays a jurisdiction identifier. Section D of FIG. E shows functionality for adding more rows to a scanned image. Section E of FIG. 3E shows a possible rotate page function. Section F of FIG. 3E shows statistics of an entire current petition selected. Section G of FIG. 3E shows a dropdown for the administrator user to see pages that may be assigned to other users for review. Section H shows a search window for the scanned petition. Section I of FIG. 3E shows a displayed serial number that may be associated with the new petition. Section K of FIG. 3E shows petition accepted rows and the jurisdiction associated with the new petition, such as a county. Section L of FIG. 3E shows possible tools to view, accept, or reject a page or a row. Row M of FIG. 3E shows page-rearward and page forward functions. In other words, once a petition is scanned, the scanned petition and associated image data may be displayed to a user via the display 105 in the manner shown in FIG. 3E, to accommodate modifications to the scanned petition, acceptance or rejection of fields, and the like.

As shown in block 314, if validation of a petition, or portions of a petition (such as a row) are rejected or deemed erroneous whatever reason, the petition or portions thereof may be denied, marked as rejected, or labeled by the application 102, e.g., an error message may be displayed. This situation may occur where one or more areas of interest of the new petition lack data sufficient data for populating required validation fields of a new petition record as defined by the new template, or where it is determined that one or more areas of the scanned image contain undesired white space instead of input data for a particular validation field. The aforementioned functionality may be managed by a dedicated input validation module 124 of the application 102, although the present disclosure is not limited in this regard.

In some embodiments, during the input data validation steps described above, the application 102 may create and maintain a candidate database (not shown) for tracking and suggesting candidate values as being suitable for populating the fields associated with the areas of the interest of the scanned petition document. These candidate values may be fed to the user interface 150 after optical character recognition is conducted or applied to the areas of the interest of the scanned petition image. These features and others may further assist to improve the processing of the petitions and other such documents.

Referencing blocks 316-318, in addition to validating input information associated with the scanned petition image, the input data derived from the scanned petition image may be verified to determine if the voter who provided the input data is even eligible for submitting the new petition, such that the new petition may be considered for further processing (e.g., creation of a new petition record). The new petition may be eligible for processing when the new petition is associated with a voter or citizen who resides in a specific jurisdiction associated with the new petition type, or when the signatory of the petition is an authorized voter for the jurisdiction according to the VR database 112. Alternatively, the new petition may be ineligible where the signatory of the new petition is not authorized to submit petitions in the jurisdiction associated with the new petition type for whatever reason. Data from any number of the validation fields may define a voter key that may be used as a reference to information of the VR database 112.

As previously described, the application 102 may access the voter registration data from a VR database 112. This may be achieved by a dedicated VR integration module 128 of the application 102, although the present application is not limited in this regard. In some embodiments, the application 102 may be operatively in communication with the VR database 112 to access data in real time, may execute one or more API calls using the VR API 114 to retrieve voter registration data to verify the new petition, and/or may store locally or otherwise information accessed from the VR database 112. In other embodiments, information from the VR database 112 may be updated according to a predetermined schedule to reflect changes to voter information.

In one embodiment, one or more validation fields associated with the signature(s) of the signatory(ies) of the new petition may be verified utilizing the voter validation module 126 of the application 102. As one example, the voter validation module 126 compares the voter data from the VR database 112 to signatures and other information from scanned petition pages in order to determine if the verification is successful (decision block 320) and may recommend the acceptance or rejection of the new petition (or one or more submissions of the petition), as shown in blocks 322 and 314 respectively. More specifically, the voter validation module 126 may be configured to conduct optical character recognition upon the scanned image(s) of the new petition, extract signature information from predetermined positions of the scanned images associated with a signature validation field, and compare the signature information to voter data of the VR database 112, to determine if the signature information e.g., matches a voter record in the VR database 112. In this manner, the signature information of the scanned petition may define a voter key useful for verifying the petition or portions thereof. FIGS. 3F-3I show exemplary scanned pages of the new petition with multiple signatures that may be verified by referencing information from the VR database 112 as described and accepted or rejected (rejected signatures may be notated with a strike-through overlaying across the scanned image). During verification of signatures or other validation fields, a voter jurisdiction may be selected using a drop-down menu of the user interface 150. With petitions, individual lines may be selected and highlighted, so that an administrator or other user can select individual signatures display on a scanned image of the new petition, and accept or reject each of the individual signatures as desired. In other words, the application 102 may enable the rejection or acceptance of some portions of the scanned new document. In some embodiments, the aforementioned verification functionality may be considered "voter adjudication," and may take place after validation sampling, which is further described herein. In the event the scanned petition image is accepted, the application 102 may generate a new petition entry and store this information within one or more of the described databases along with other accepted petitions for further processing.

Figure 4A:
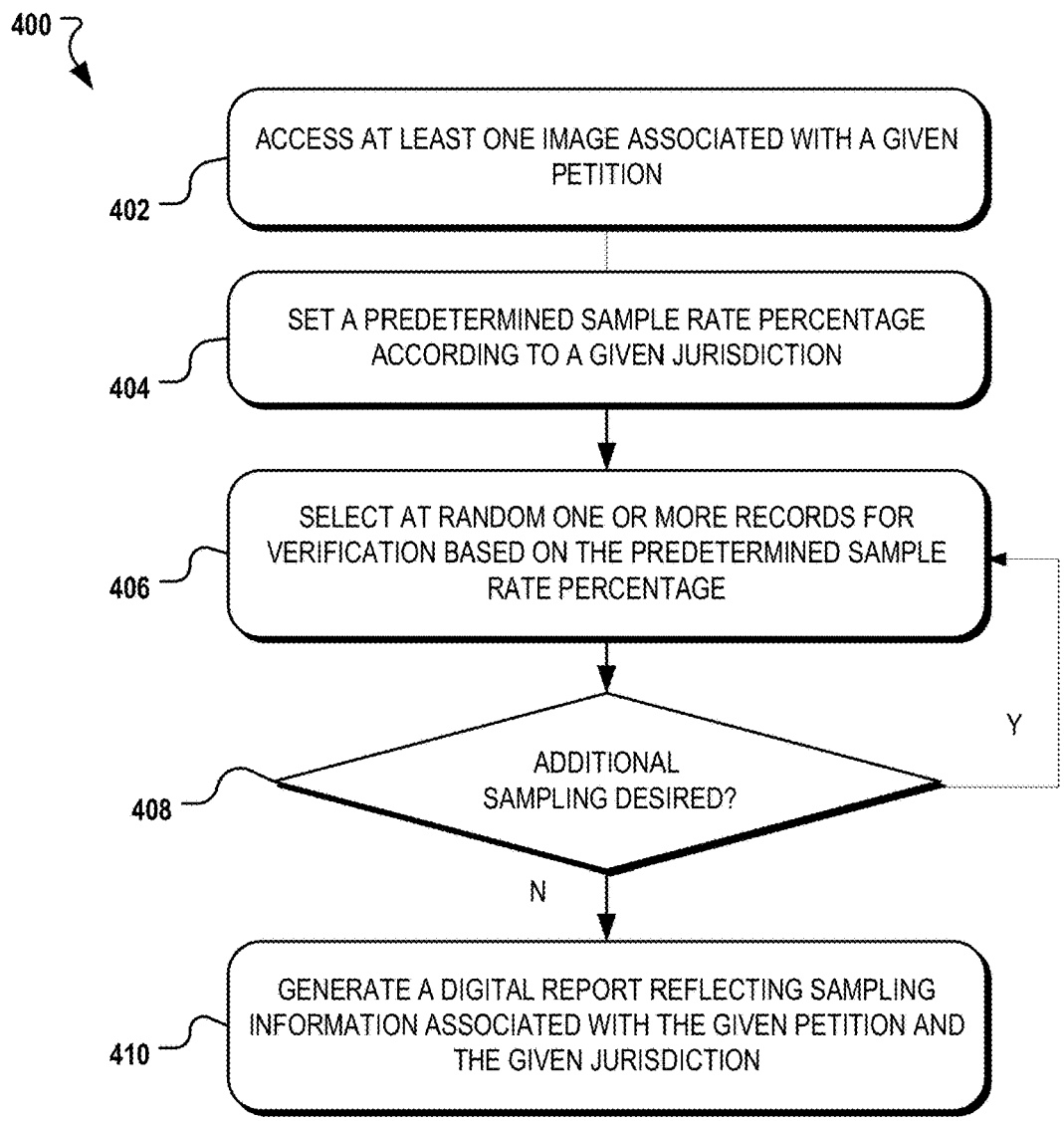
FIG. 4A is a simplified block diagram of a flow chart showing an exemplary process flow for validation sampling.
Figure 4B:
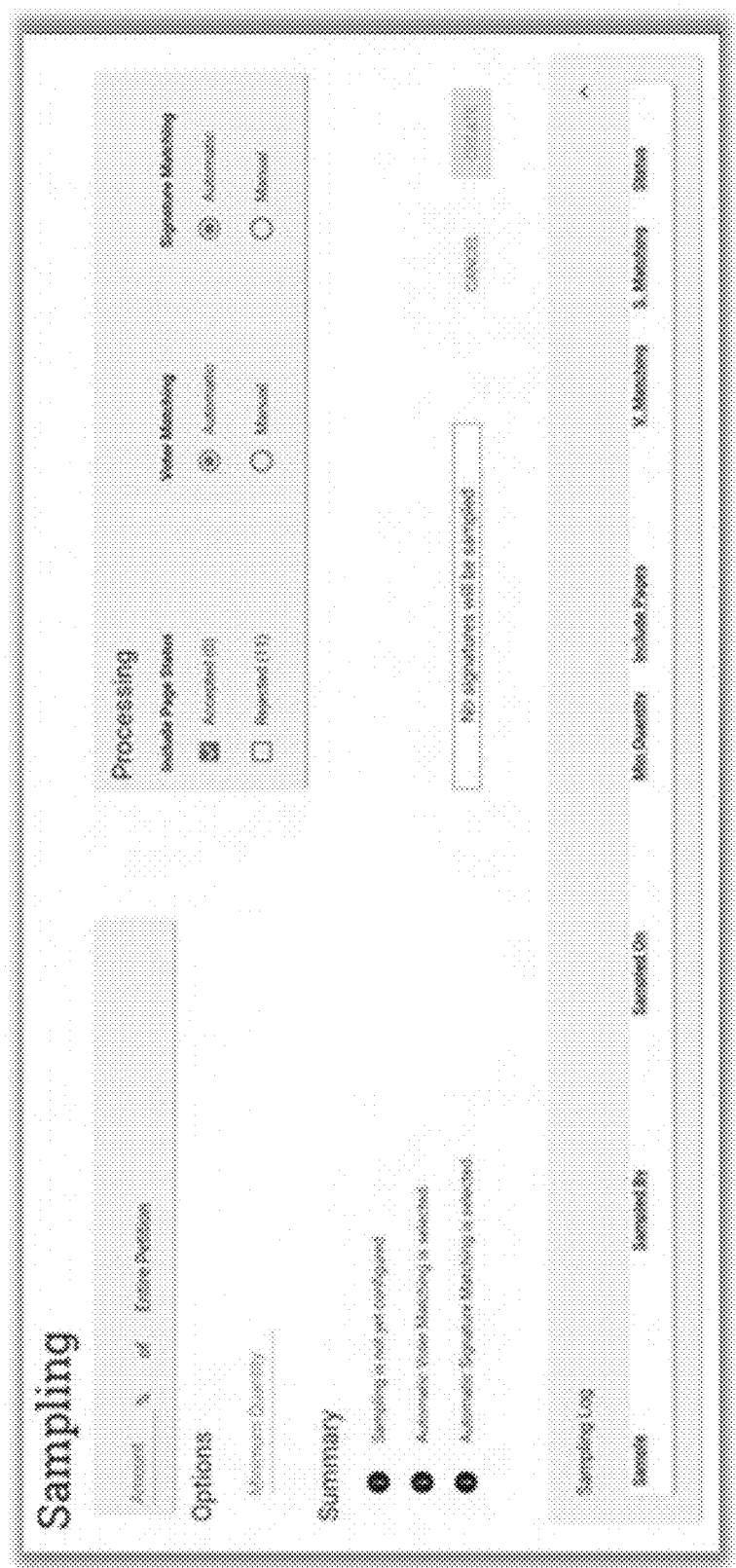
FIG. 4B is an application screenshot illustrating functionality for validation sampling as described herein and referenced by FIG. 4A.
Figure 4C:
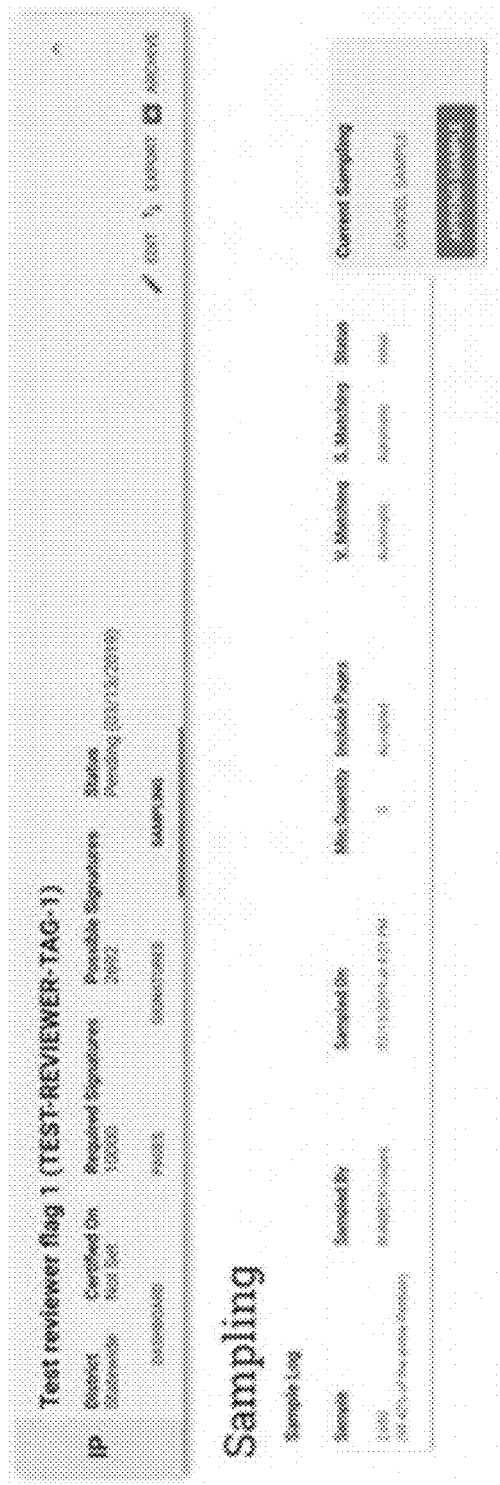
FIG. 4C is an application screenshot illustrating functionality for validation sampling as described herein and referenced by FIG. 4A.

Referring to FIGS. 4A-4C and process flow 400, with reference to FIGS. 1A-1G, and process flows 200 and 300, the application 102 may further be configured to accommodate sampling, or validation sampling, of one or more election documents such as petitions using the validation sampling module 130 of the application 102. Rules or guidelines for sampling in different jurisdictions may be defined within the application 102 by an authorized user, and validation sampling may be monitored by the display 105 via the user interface 150. In the case of validation sampling for petition records, a total number of petition records associated with scanned images may be retrieved or accessed for validation and verification. A sampling percentage may be set or defined (based on jurisdictional rules), and a randomized sample subset of the total number of rows of a scanned petition (or multiple scanned petitions) may be used to create the sample group. The scanned petition records used for sampling may then be analyzed to determine if the sample percentage is met, and statistics may be displayed for review. Sampling may further be logged or otherwise tracked.

More specifically, as shown in block 402, a plurality of records from one or more scanned images associated with elections documents may be accessed from the scanning device 110, or a database or memory. In some embodiments, this plurality of records defines a total number of scanned petitions or may define a total plurality of rows of a scanned petition. Referring to block 404, a sample rate may be determined, set, or preconfigured and may be set based on a given jurisdiction and associated rules. The sample rate may define a required success or acceptance percentage of a subset of the total plurality records as required or specified by the jurisdiction. For example, in the case of a petition, the sample rate may require that a particular percentage of a random sample subset of the total scanned rows or records of a petition be successfully validated and verified, or otherwise satisfy elections rules associated with data input for each record or row of a petition. The number of rows of the random sample subset that are processed (validated and verified) may also be specified based on jurisdictional rules.

Referring to block 406, the aforementioned sample subset of petition records may be validated and verified as per the process flow 300 described above and illustrated in FIG. 3A. Where the application 102 determines that the sample subset satisfies the sample rate percentage in block 404, a notification may be generated that the sample subset contains a sufficient number of acceptable petition records to comply with rules of a given jurisdiction. At decision block 408, sampling may continue as needed and described in block 406. Referring to block 410, if no additional sampling is needed, a digital report may be generated or logged to illustrate information about the sampling conducted.

Figure 5A:
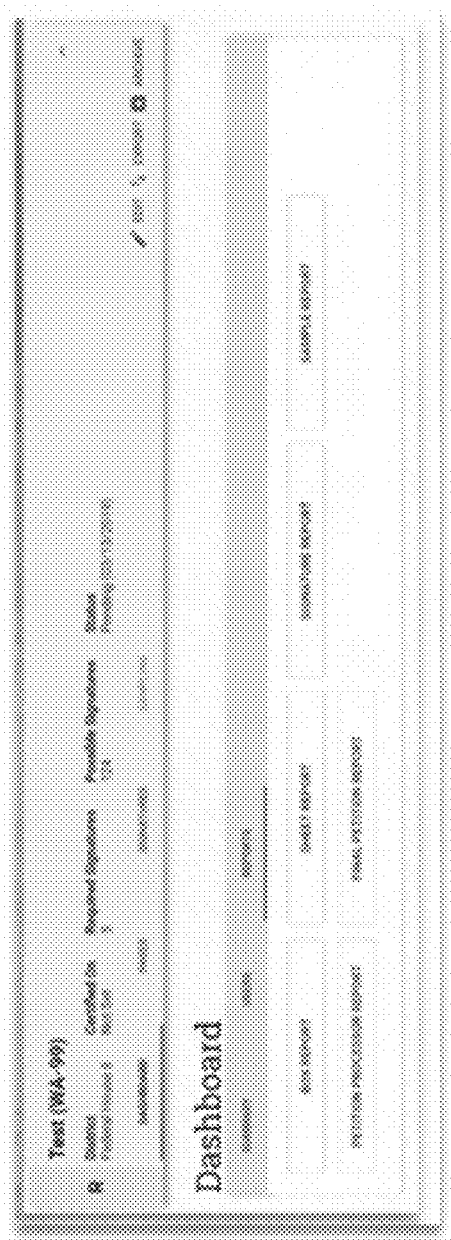
FIG. 5A-5D are application screenshots illustrating possible digital reports created using the present system.
Figure 5B:
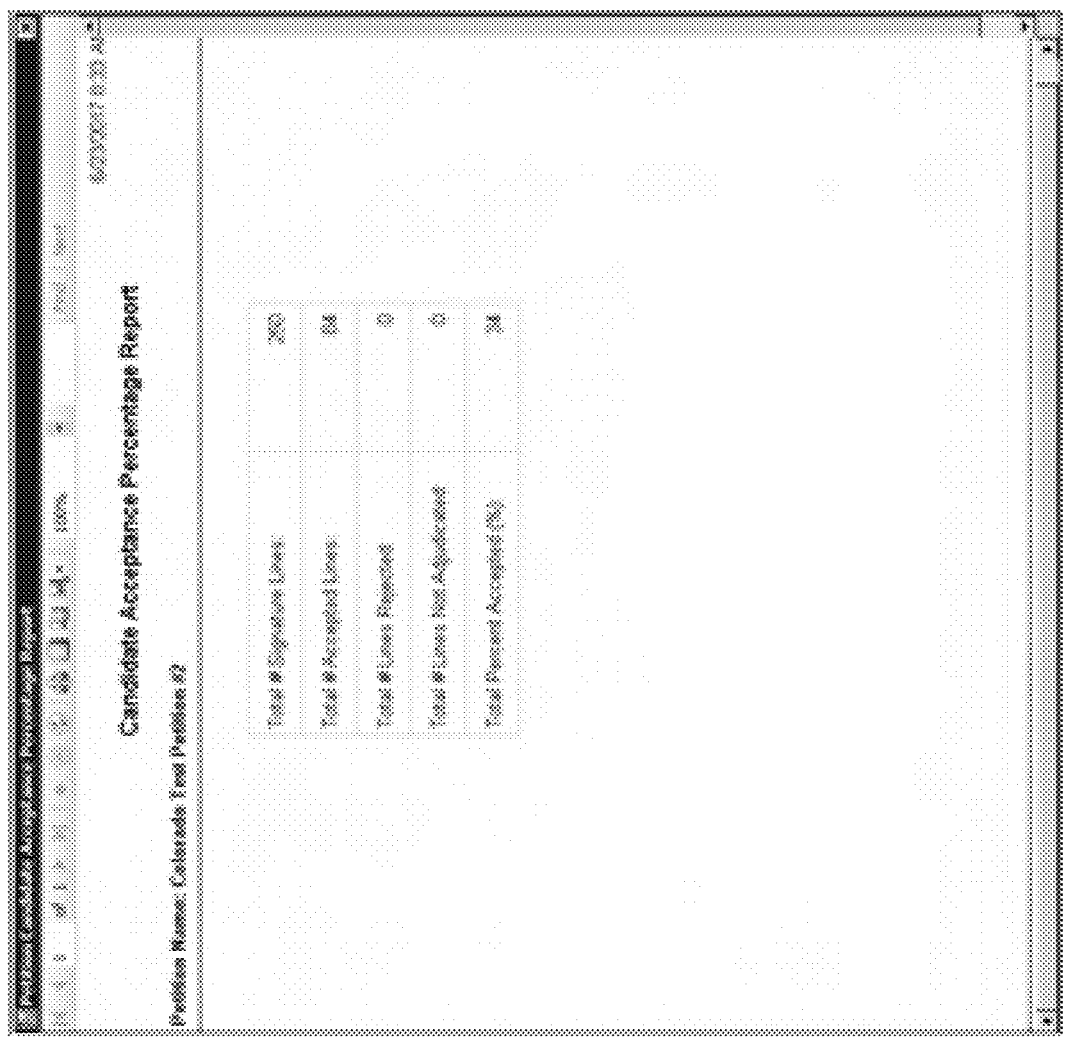
Figure 5C:
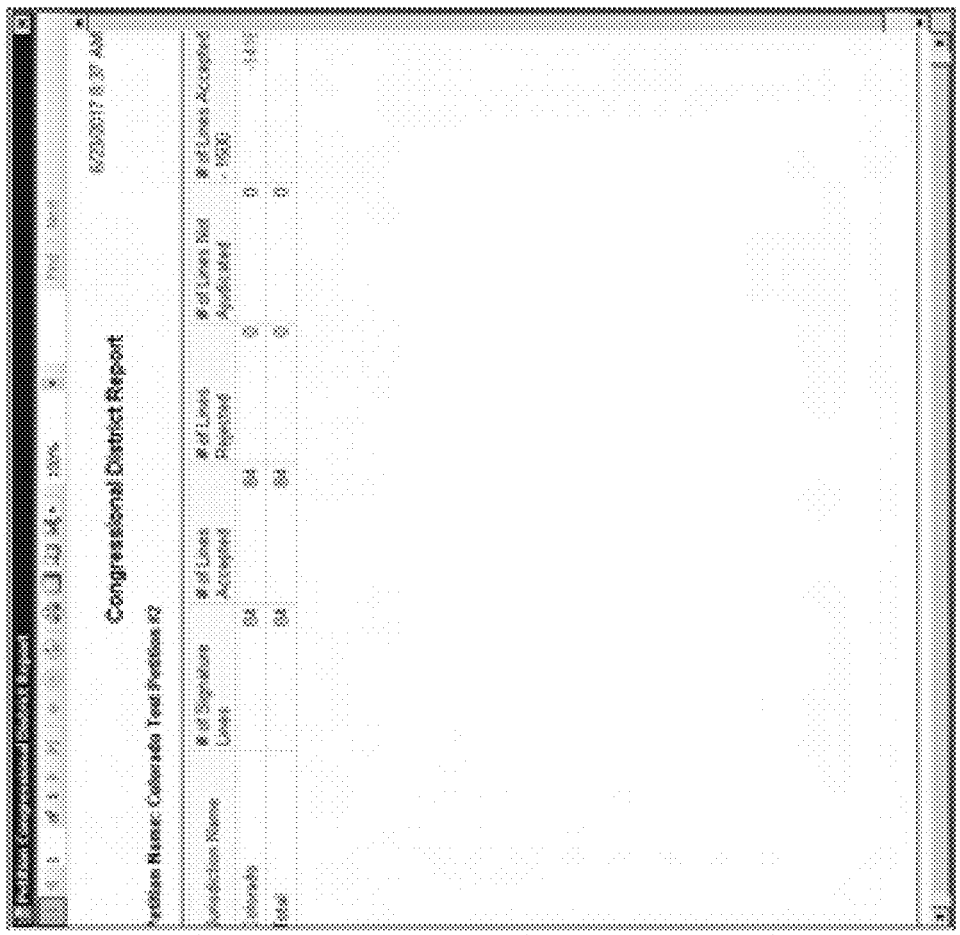
Figure 5D:
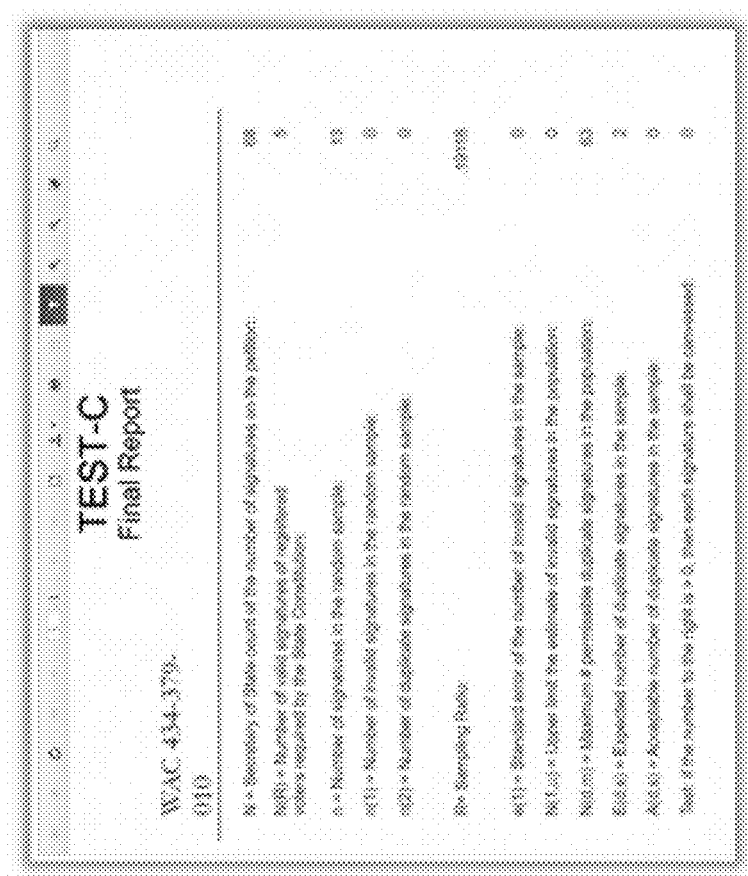
Figure 6A:
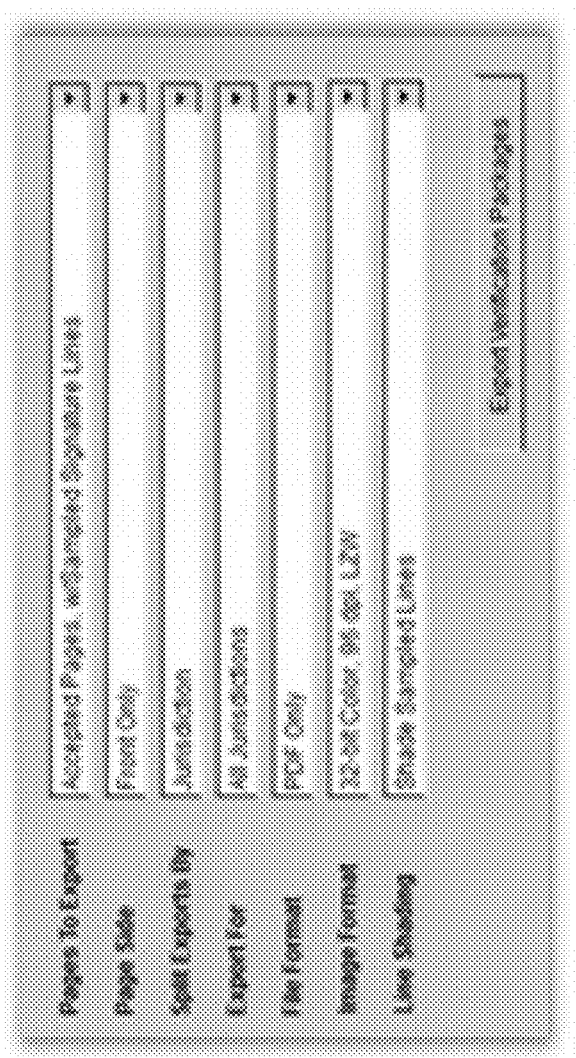
FIGS. 6A-6C are application screenshots illustrating possible functionality for exporting information using the present system.
Figure 6B:
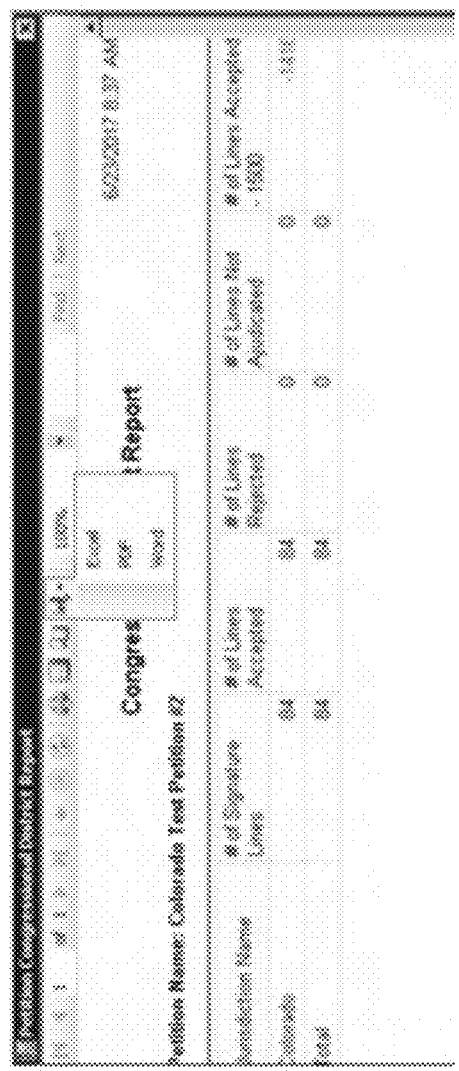
Figure 6C:
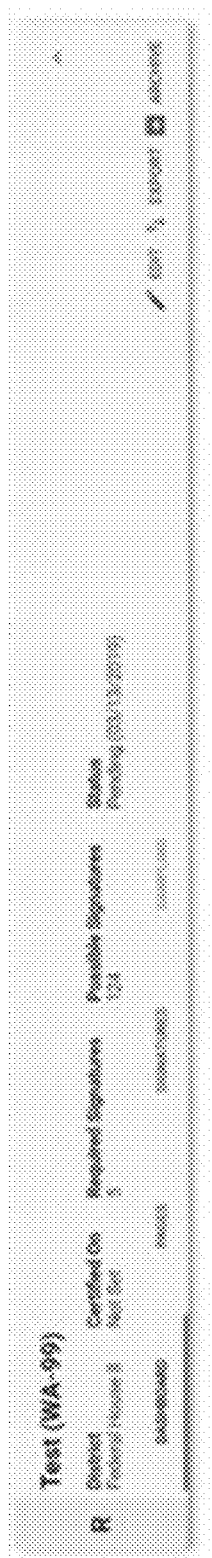

Referring to FIGS. 5A-5C, a plurality of different types of reports may be generated using a reporting module 132 of the application 102. The reports may be stored and/or exportable to other systems. Referring to FIGS. 6A-6B, sampling reports, or other information about the validation and verification of new petitions, may be packaged and exported, or otherwise made accessible as needed for other systems. Information about any of the petition information described herein may be packaged in file formats such as PDF, TIFF, or combinations thereof. Certain pages of scanned petition documents may be selected for export, and other specifications and parameters may be adjusted depending upon the given jurisdiction associated with the petition documents and/or where the petition information needs to be sent.

Additional embodiments and features are contemplated and related to the subject matter described herein. For example, in some embodiments the application 102 may be implemented using a parallelization feature to parallelize the functionality of certain functions, modules, services, or processes, such as the signature matching process 140 and the voter matching process 142. By way of background, in some embodiments, the present inventive concept may utilize multiple modular modules, services, or programs combined as part of the system 100, and many of such programs may utilize low-level code that cannot take full advantage of server hardware but also may not be able to be executed in a multi-threaded fashion. In some embodiments, these programs can therefore only scale out by running on their own processes.

As a solution to the aforementioned technical problem, the parallelization feature may relate to a proprietary software processing system in which a process with any number of clones can check work out from an assignment provider, do the work, then check it back in as "Complete" or, in the case of a shutdown request, before the work is done, "Incomplete". Any such process can run by itself or in parallel with any number of clones to scale out without duplicating any work. Because WINDOWS® Operating System requires that any process be installed by a uniquely signed installer, the deployment of this architecture may be made possible by a separate, also proprietary system. A build system (not shown) may be implemented with the described parallelization feature that dynamically builds a single codebase into an installation program which embeds unique installers for the number of processes requested.

In other words, using the described parallelization feature, multiple services or processes, such as the signature matching process 140 and the voter matching process 142, may be executed and running parallel, to reduce time ordinarily spent to process petition or ballot images. In some embodiments, the parallelization feature may involve capturing rows of e.g., a scanned petition, parsing the rows out and allocating a process (e.g., the signature matching process 140) to a certain number of rows (with other processes such as the voter matching process 142 servicing other rows) in order to more effectively utilize the CPU. This improves upon row-by-row processing of petition images.

Figure 7:
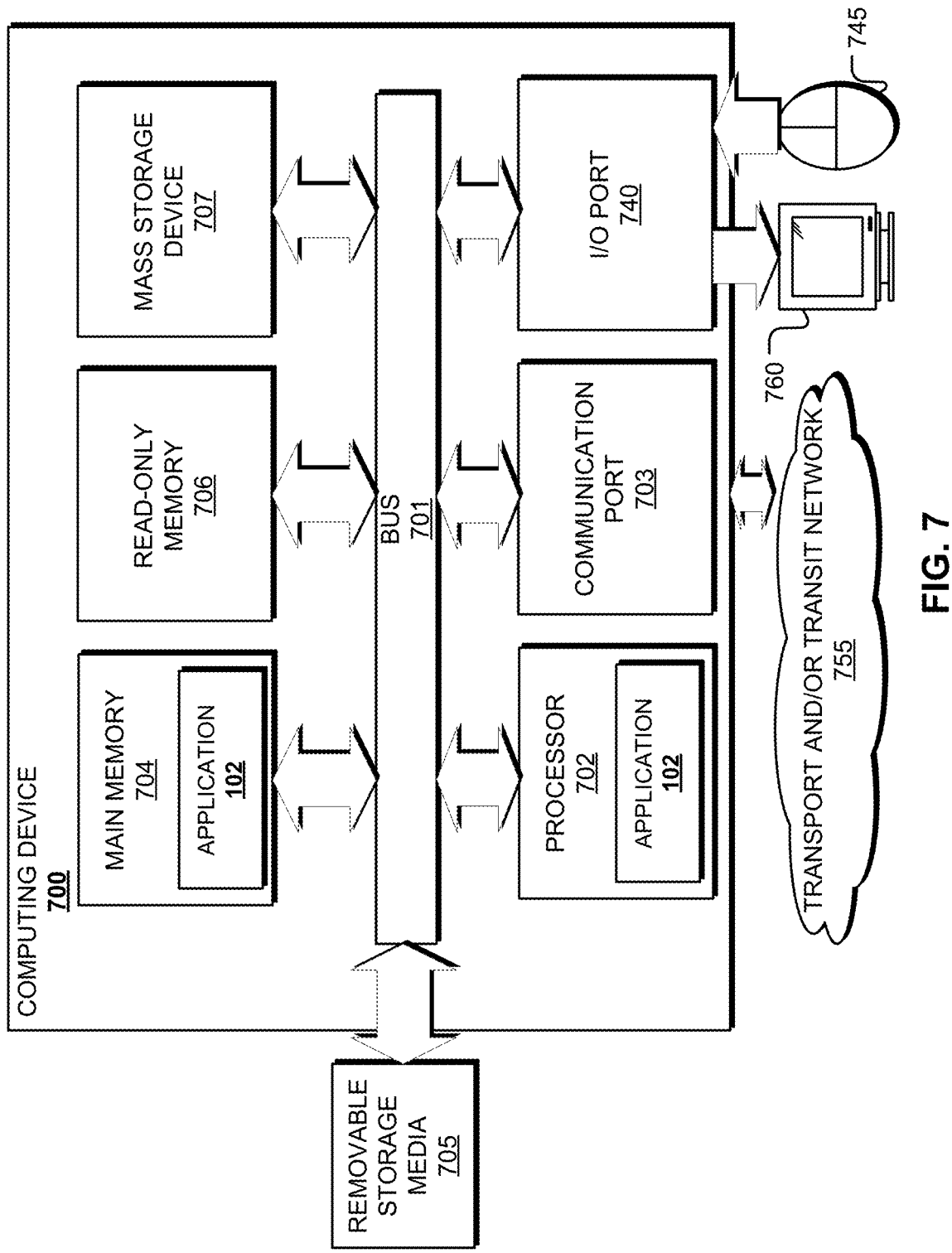
FIG. 7 is a simplified block diagram showing an example of a computing system that may implement various services, systems, and methods discussed herein.

FIG. 7 is an example schematic diagram of a computing device 700 that may implement various methodologies discussed herein. For example, the computing device 700 may comprise the local computing device 108 executing or accessing functionality and/or aspects of the application 102. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules, such as the components of the application 102 including the modules and services 121. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A computer-implemented system, comprising:
a scanning device operable to generate a plurality of scanned images associated with a plurality of documents, the plurality of documents being associated with elections;
a memory device in operative communication with the scanning device, the memory device storing the plurality of scanned images generated by the scanning device and a plurality of predefined templates; and
a processor in operable communication with the scanning device and memory device, the processor operable to:
access a scanned image of the plurality of scanned images from the memory device, the scanned image associated with a document of the plurality of documents and defining a document type,
access, based on the document type, a template of the plurality of predefined templates, the template defining areas of interest of the scanned image, each of the areas of interest corresponding to predetermined locations of the scanned image associated with fields of the document,
apply a first function to a set of feature values associated with the areas of interest to validate each of the areas of interest,
access voter registration data associated with a voter registration database,
apply a second function to a subset of the set of feature values associated with at least one of the areas of interest to generate a voter key associated with the document, and
determine whether at least one record of the voter registration data matches the voter key associated with the document,
wherein the document comprises a petition and the processor is further operable to:
access a set of the areas of interest corresponding to rows of the petition as defined by the template;
identify a sample rate percentage based on the document type of the scanned image, the sample rate percentage being predetermined and associated with a jurisdiction corresponding to the petition; and validate a randomized subset of the set of the areas of interest of the scanned image corresponding to a portion of the rows of the petition to determine whether a percentage of the portion of the rows includes data that satisfies predetermined rules for acceptance of the petition, the percentage corresponding to the sample rate percentage.

2. The computer-implemented system of claim 1:
wherein the second function includes applying optical character recognition to the subset of the set of feature values to identify characters from the subset of feature values, and
identifying the voter key from the characters.

3. The computer-implemented system of claim 1, wherein the processor is further operable to:
build a database for storage in the memory device, the database comprising cached candidate values, the cached candidate values identified as being suitable for certain ones of the areas of interest.

4. The computer-implemented system of claim 1, wherein the processor is further operable to:
generate a confidence rating associated with a match between the at least one record of the voter registration data and the voter key.

5. The computer-implemented system of claim 1, wherein the set of feature values associated with the areas of interest define specific column and row pairs of pixels of the scanned image.

6. The computer-implemented system of claim 1, wherein the processor is further operable to:
access parameters for configuring a new template, the parameters defining information associated with a new petition type,
configuring the new template to identify certain areas of interest of a new image associated with the new petition type based on the parameters, and
generating the new template for storage and access via the memory device.

7. A method for processing scanned images of a document related to elections, comprising:
accessing an image of a document associated with elections;
identifying areas of interest along the scanned image by referencing a template, the template defining fields of the document corresponding to the areas of interest;
validating feature values associated with the areas of interest to determine whether the scanned image includes sufficient information for populating the fields of the document and complying with predetermined rules; and
comparing a subset of the feature values associated with a signature with information from a voter registration database to verify eligibility of the document based on the signature.

8. The method of claim 7, wherein the document comprises a petition defining a plurality of rows, each of the plurality of rows defining a voter.

9. The method of claim 8, wherein the subset of the feature values relates to a particular voter associated with a row of the plurality of rows.

10. The method of claim 7, further comprising validating the feature values and verifying the subset of the feature values in parallel.

11. The method of claim 7, further comprising:
interpreting characters from the feature values using optical character recognition; and
displaying the characters via a user interface.

12. The method of claim 11, further comprising providing a button along the user interface configured to reject certain ones of the characters as interpreted.

13. A computing device including a display device in operative communication with the computing device, the computing device being configured to process a scanned image of a document associated with elections by validating image data associated with areas of interest of the scanned image and verifying eligibility of the document based on comparison between a signature identified from the scanned image and associated signature information of a voter registration database, the areas of interest defined by a template preconfigured according to a document type associated with the document, wherein the computing device is additionally configured to display aspects of the image data via a user interface implemented by the display device to accommodate access to the image data via the user interface.

14. The computing device of claim 13, wherein the computing device is further configured to validate a first portion of the scanned image and a second portion of the scanned image in parallel.

15. The computing device of claim 13, wherein the computing device is configured with subset of a plurality of modules, the subset uniquely selected from the plurality of modules according to predetermined image processing specifications associated with the computing device.

16. The computing device of claim 13, wherein the computing device is configured to access voter registration data.

17. The computing device of claim 16, wherein the computing device is configured to leverage the voter registration data to validate portions of the document.

18. The computing device of claim 13, wherein the computing device is configured to dynamically build a codebase into an installation program which embeds unique installers for the number of processes associated with validation of the document.

* * * * *